(12) United States Patent
Guo et al.

(10) Patent No.: US 9,185,405 B2
(45) Date of Patent: Nov. 10, 2015

(54) CODED BLOCK FLAG INFERENCE IN VIDEO CODING

(71) Applicant: QUALCOMM Incorporated, San Diego, CA (US)

(72) Inventors: Liwei Guo, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 13/828,416

(22) Filed: Mar. 14, 2013

(65) Prior Publication Data

US 2013/0251026 A1    Sep. 26, 2013

Related U.S. Application Data

(60) Provisional application No. 61/614,983, filed on Mar. 23, 2012.

(51) Int. Cl.
*H04N 11/02* (2006.01)
*H04N 19/136* (2014.01)
*H04N 19/70* (2014.01)
*H04N 19/196* (2014.01)
*H04N 19/96* (2014.01)
*H04N 19/463* (2014.01)
*H04N 19/90* (2014.01)

(52) U.S. Cl.
CPC ....... *H04N 19/00139* (2013.01); *H04N 19/196* (2014.11); *H04N 19/463* (2014.11); *H04N 19/70* (2014.11); *H04N 19/90* (2014.11); *H04N 19/96* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 2012/0106649 A1* | 5/2012 | Wang et al. | 375/240.18 |
| 2012/0183080 A1 | 7/2012 | Zhou | |
| 2012/0230421 A1* | 9/2012 | Chen et al. | 375/240.18 |
| 2012/0308148 A1 | 12/2012 | Kim et al. | |
| 2013/0003824 A1 | 1/2013 | Guo et al. | |
| 2013/0004092 A1 | 1/2013 | Sasai et al. | |

OTHER PUBLICATIONS

International Preliminary Report on Patentability from International Application No. PCT/US2013033487, dated Jul. 23, 2014, 15 pp.

(Continued)

*Primary Examiner* — Dave Czekaj
*Assistant Examiner* — Leron Beck
(74) *Attorney, Agent, or Firm* — Shumaker & Sieffert, P.A.

(57) ABSTRACT

A video decoder determines whether a first condition is satisfied. The first condition is satisfied when any sibling residual quad tree (RQT) node of a current RQT node is associated with a significant luma coefficient block. In addition, the video decoder determines whether a second condition is satisfied. The second condition is satisfied when a chroma transform block of a parent RQT node of the current RQT node is significant and is split along with a luma transform block of the parent RQT node. In response to determining that neither the first nor the second condition is satisfied, the video decoder determines that a luma coded block flag (CBF) for the current RQT node is omitted from the bitstream.

42 Claims, 8 Drawing Sheets

(56) References Cited

OTHER PUBLICATIONS

Itu-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Response to Second Written Opinion dated Sep. 19, 2013, from International Application No. PCT/US2013/033487, filed on Jan. 13, 2014, 34 pp.
An, et al., "Non-CE2: Separate RQT structure for Y, U and V components", JCT-VC Meeting; MPEG Meeting; Feb. 1-10, 2012; San Jose; (Joint Collaborative Team on Video Coding of ISO/IEC JTC1/SC29/WG11 and ITU-T Sg.16); Url: http://wftp3.itu.int/av-arch/jctvc-site/, No. JCTVC-H0315, XP030111342, 23 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-H1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103V_d2, 214 pp.
Guo et al., "Unified CBFU and CBFV Coding in RQT", MPEG Meeting; Apr. 27-May 7, 2012, Geneva; (Motion Picture Expert Group or ISO/IEC JTC1/SC29/WG11) No. m24579, XP030052922, 6 pp.
Guo et al., "Unified CBFU and CBFV Coding in RQT", JCT-VC Meeting; MPEG Meeting; Apr. 27-May 7, 2012, Geneva; (Joint Collaborative Team on Video Coding of ISO/IEC JTC1/SC29/WG11 and ITU-T Sg.16); Url: http://wftp3.itu.int/av-arch/jctvc-site/,, No. JCTVC-I0332, XP030112095, 6 pp.

International Search Report and Written Opinion—PCT/US2013/033487—ISA/EPO—Sep. 19, 2013, 21 pp.
Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Kim et al., "CBF coding without derivation process", MPEG Meeting; Apr. 27-May 7, 2012, Geneva; (Motion Picture Expert Group or ISO/IEC JTC1/SC29/WG11) No. m24391, XP030052736, 7 pp.
Li et al., "Simplification on CBF inference and coding", JCT-VC Meeting; MPEG Meeting; Jul. 11-20, 2012, Stockholm; (Joint Collaborative Team on Video Coding of ISO/IEC JTC1/SC29/WG11 and ITU-T Sg.16); Url: http://vvftp3.itu.int/av-arch/jctvc-site/ No. JCTVC-J0241, XP030112603, 6 pp.
Partial International Search Report—PCT/US2013/033487—ISA/EPO—Jul. 29, 2013, 7 pp.
Sugimoto et al., "CE2 4.2: report on fixed TU depth for chroma", JCT-VC Meeting; MPEG Meeting; Feb. 1-10, 2012; San Jose; (Joint Collaborative Team on Video Coding of ISO/IEC JTC1/SC29/WG11 and ITU-T Sg.16); Url: http://wftp3.itu.int/av-arch/jctvc-site/ No. JCTVC-I-10235, XP030111262, 5 pp.
Sugimoto et al., "CE2: Summary Report of Core Experiment on Chroma ROT Depth", JCT-VC Meeting; MPEG Meeting; Feb. 1-10, 2012; San Jose; (Joint Collaborative Team on Video Coding of ISO/IEC JTC1/SC29/WG11 and ITU-T Sg.16); Url: http://wftp3.itu.int/av-arch/jctvc-site/ No. JCTVC-H0032 XP030111068, 14 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand, T., et al., "WD3: Working Draft 3 of High-Efficiency Video Coding," Document JCTVC-E603, 5th Meeting: Geneva, CH, Mar. 16-23, 2011, pp. 193.
Wiegand et al., "WD1: Working Draft 1 of High-Efficiency Video Coding", JCTVC-C403, 3rd Meeting: Guangzhou, CN, Oct. 7-15, 2010, 137 pp.
Zhou et al., "Evaluation Results on Residual Quad Tree (RQT)", MPEG Meeting, Jan. 20-28, 2011, DAEGU, (Motion Picture Expert Group or ISO/IEC JTCI/SC29/WG11), No. m18807, XP030047377, 7 pp.
F. Bossen, "Common test conditions and software reference configurations", JCTVC-I-11100, JCTVC Meeting, San Jose, USA, Feb. 2012, 3 pp.
T. K. Tan and F. Bossen, "Chrome RD cost computation in HM3.0", JCTVC-F386, JCT-VC Meeting, Torino, IT, Jul., 2011, 14 pp.
Guo et al., "Proposed Fix on CBFY Interference at Minimum TU Size," JCTVC-10334, Apr. 27-May 7, 2012, 5 pp.

* cited by examiner

CODED BLOCK FLAG INFERENCE IN VIDEO CODING

This application claims the benefit of U.S. Provisional Patent Application No. 61/614,983, filed Mar. 23, 2012, the entire content of which is incorporated herein by reference.

TECHNICAL FIELD

This disclosure relates to video coding and compression and, in particular, to coding of coded block flags.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

SUMMARY

In general, this disclosure describes techniques for signaling the presence of significant luma coefficient blocks. A significant luma coefficient block may be a luma coefficient block that includes one or more non-zero transform coefficients. More specifically, a video encoder may generate a bitstream that includes data that represent a residual quad tree (RQT) for a coding unit (CU). The RQT may indicate how the CU is decomposed into transform units (TUs). A root node of the RQT corresponds to the CU as a whole, and leaf nodes of the RQT correspond to transform units (TUs) of the CU. All nodes of the RQT aside from the leaf nodes have four child nodes in the RQT. The nodes of the RQT may be associated with luma coded block flags (CBFs). A luma CBF of a node indicates whether the node is associated with a significant luma coefficient block. A node may be associated with a significant luma coefficient block if a TU associated with the node, or any TU associated with any child node of the node, has a significant luma coefficient block.

If none of the sibling RQT nodes of a current RQT node are associated with a significant luma coefficient block, and a parent RQT node of the current RQT node is not associated with a significant chroma coefficient block or a size of a luma transform block of the current RQT node is not greater than a minimum transform size, a video decoder can infer that the current RQT node is associated with a significant luma coefficient block. The video decoder may make this inference without extracting a luma CBF for the current RQT node from the bitstream. Hence, in this situation, a video encoder does not include a luma CBF for the current RQT node in the bitstream.

In one example, this disclosure describes a method of decoding video data. The method comprises determining whether a first condition is satisfied, wherein the first condition is satisfied when any sibling RQT node of a current RQT node of a RQT of a CU is associated with a significant luma coefficient block. In addition, the method comprises determining whether a second condition is satisfied. The second condition is satisfied when a chroma transform block of a parent RQT node of the current RQT node is significant and the chroma transform block of the parent RQT node is split with a luma transform block of the parent RQT node. The method also comprises, when neither the first nor the second condition is satisfied, determining that a luma CBF is omitted from the bitstream. Furthermore, the method comprises, when the luma CBF is omitted from the bitstream or when the luma CBF indicates that syntax elements of a luma coefficient block are signaled in the bitstream, extracting the syntax elements of the luma coefficient block from the bitstream. In addition, the method comprises reconstructing a sample block of the CU based at least in part on the luma coefficient block.

In another example, this disclosure describes a video decoding device comprising one or more processors configured to determine whether a first condition is satisfied, wherein the first condition is satisfied when any sibling RQT node of a current RQT node of a RQT of a CU is associated with a significant luma coefficient block. The one or more processors are also configured to determine whether a second condition is satisfied, wherein the second condition is satisfied when a chroma transform block of a parent RQT node of the current RQT node is significant and the chroma transform block of the parent RQT node is split with a luma transform block of the parent RQT node. Furthermore, the one or more processors are configured such that when neither the first nor the second condition is satisfied, the one or more processors determine that a CBF is omitted from the bitstream. The one or more processors are configured such that when the luma CBF is omitted from the bitstream or when the luma CBF indicates that syntax elements of a luma coefficient block are signaled in the bitstream, the one or more processors extract the syntax elements of the luma coefficient block from the bitstream. In addition, the one or more processors are configured to reconstruct a sample block of the CU based at least in part on the luma coefficient block.

In another example, this disclosure describes a video decoding device comprising means for determining whether a first condition is satisfied, wherein the first condition is satisfied when any sibling RQT node of a current RQT node of a RQT of a CU is associated with a significant luma coefficient block. The video decoding device also comprises means for determining whether a second condition is satisfied, wherein the second condition is satisfied when a chroma transform block of a parent RQT node of the current RQT node is significant and the chroma transform block of the parent RQT node is split with a luma transform block of the parent RQT node. In addition, the video decoding device comprises means for determining, when neither the first nor the second condition is satisfied, that a luma coded block flag (CBF) is omitted from the bitstream. In addition, the video decoding device comprises means for extracting, when the luma CBF is omitted from the bitstream or when the luma CBF indicates that syntax elements of a luma coefficient block are signaled in the bitstream, the syntax elements of the luma coefficient block from the bitstream. The video decoding device also comprises means for reconstructing a sample block of the CU based at least in part on the luma coefficient block.

In another example, this disclosure describes a computer-readable storage medium having instructions stored thereon that, when executed by one or more processors of a video decoding device, configure the video decoding device to determine whether a first condition is satisfied, wherein the first condition is satisfied when any sibling RQT node of a current RQT node of a RQT of a CU is associated with a significant luma coefficient block. The instructions also configure the video decoding device to determine whether a second condition is satisfied, wherein the second condition is satisfied when a chroma transform block of a parent RQT node of the current RQT node is significant and the chroma transform block of the parent RQT node is split with a luma transform block of the parent RQT node. Furthermore, the instructions configure the video decoding device to determine, when neither the first nor the second condition is satisfied, that a luma CBF is omitted from the bitstream. The instructions also cause the video decoding device to extract, when the luma CBF is omitted from the bitstream or when the luma CBF indicates that syntax elements of a luma coefficient block are signaled in the bitstream, the syntax elements of the luma coefficient block from the bitstream. In addition, the instructions configure the video decoding device to reconstruct a sample block of the CU based at least in part on the luma coefficient block In another example, this disclosure describes a method for encoding video data. The method comprises determining whether a first condition is satisfied, wherein the first condition is satisfied when any sibling RQT node of a current RQT node is associated with a significant luma coefficient block. The method also comprises determining whether a second condition is satisfied, wherein the second condition is satisfied when a chroma transform block of a parent RQT node of the current RQT node is significant and the chroma transform block of the parent RQT node is split with a luma transform block of the parent RQT node. Furthermore, the method comprises, in response to determining that either the first condition or the second condition is satisfied, including a luma CBF in a bitstream, the luma CBF indicating whether the current RQT node is associated with a significant luma coefficient block. The method also comprises outputting the bitstream.

In another example, this disclosure describes a video encoding device comprising one or more processors configured to determine whether a first condition is satisfied, wherein the first condition is satisfied when any sibling RQT node of a current RQT node is associated with a significant luma coefficient block. The one or more processors are configured to determine whether a second condition is satisfied, wherein the second condition is satisfied when a chroma transform block of a parent RQT node of the current RQT node is significant and the chroma transform block of the parent RQT node is split with a luma transform block of the parent RQT node. Furthermore, the one or more processors are configured such that, in response to determining that either the first condition or the second condition is satisfied, the one or more processors include a luma CBF in a bitstream, the luma CBF indicating whether the current RQT node is associated with a significant luma coefficient block. The one or more processors are configured to output the bitstream.

In another example, this disclosure describes a video encoding device comprising means for determining whether a first condition is satisfied, wherein the first condition is satisfied when any sibling RQT node of a current RQT node is associated with a significant luma coefficient block. In another example, the video encoding device comprises means for determining whether a second condition is satisfied, wherein the second condition is satisfied when a chroma transform block of a parent RQT node of the current RQT node is significant and the chroma transform block of the parent RQT node is split with a luma transform block of the parent RQT node. Furthermore, the video encoding device comprises means for including, in response to determining that either the first condition or the second condition is satisfied, a luma CBF in a bitstream, the luma CBF indicating whether the current RQT node is associated with a significant luma coefficient block. In addition, the video encoding device comprises means for outputting the bitstream.

In another example, this disclosure describes a computer-readable storage medium having instructions stored thereon that, when executed by one or more processors of a video encoding device, configure the video encoding device to determine whether a first condition is satisfied, wherein the first condition is satisfied when any sibling RQT node of a current RQT node is associated with a significant luma coefficient block. In addition, the instructions configure the video encoding device to determine whether a second condition is satisfied, wherein the second condition is satisfied when a chroma transform block of a parent RQT node of the current RQT node is significant and the chroma transform block of the parent RQT node is split with a luma transform block of the parent RQT node. The instructions also configure the video encoding device such that in response to determining that either the first condition or the second condition is satisfied, the video encoding device includes a luma CBF in a bitstream, the luma CBF indicating whether the current RQT node is associated with a significant luma coefficient block. In addition, the instructions configure the video encoding device to output the bitstream.

In another example, this disclosure describes a method of decoding video data. The method comprises receiving a luma transform block, a U chroma transform block, and a V chroma transform block size. In addition, the method comprises receiving a split syntax element for the luma transform block. Furthermore, the method comprises splitting the luma transform block into a first, second, third, and fourth luma transform subblock based on the split syntax element, and not splitting the U chroma transform block and the V chroma transform block. In addition, the method comprises receiving coded block flags for the first, second and third luma transform subblocks, wherein each of the coded block flags has a value of 0. The method also comprises inferring that a coded block flag for the fourth luma transform subblock has a value of 1.

In another example, this disclosure describes a method for encoding video data. The method comprises coding a luma transform block, a U chroma transform block, and a V chroma transform block. In addition, the method comprises coding a split syntax element for the luma transform block. Furthermore, the method comprises splitting the luma transform block into a first, second, third, and fourth luma transform subblock based on the split syntax element, and not splitting the U chroma transform block and the V chroma transform block. In addition, the method comprises coding coded block flags for the first, second and third luma transform subblocks, wherein each of the coded block flags has a value of 0. Furthermore, the method comprises skipping coding a coded block flag for the fourth luma transform subblock.

The details of one or more examples of the disclosure are set forth in the accompanying drawings and the description below. Other features, objects, and advantages will be apparent from the description, drawings, and claims.

DETAILED DESCRIPTION

Figure 1:
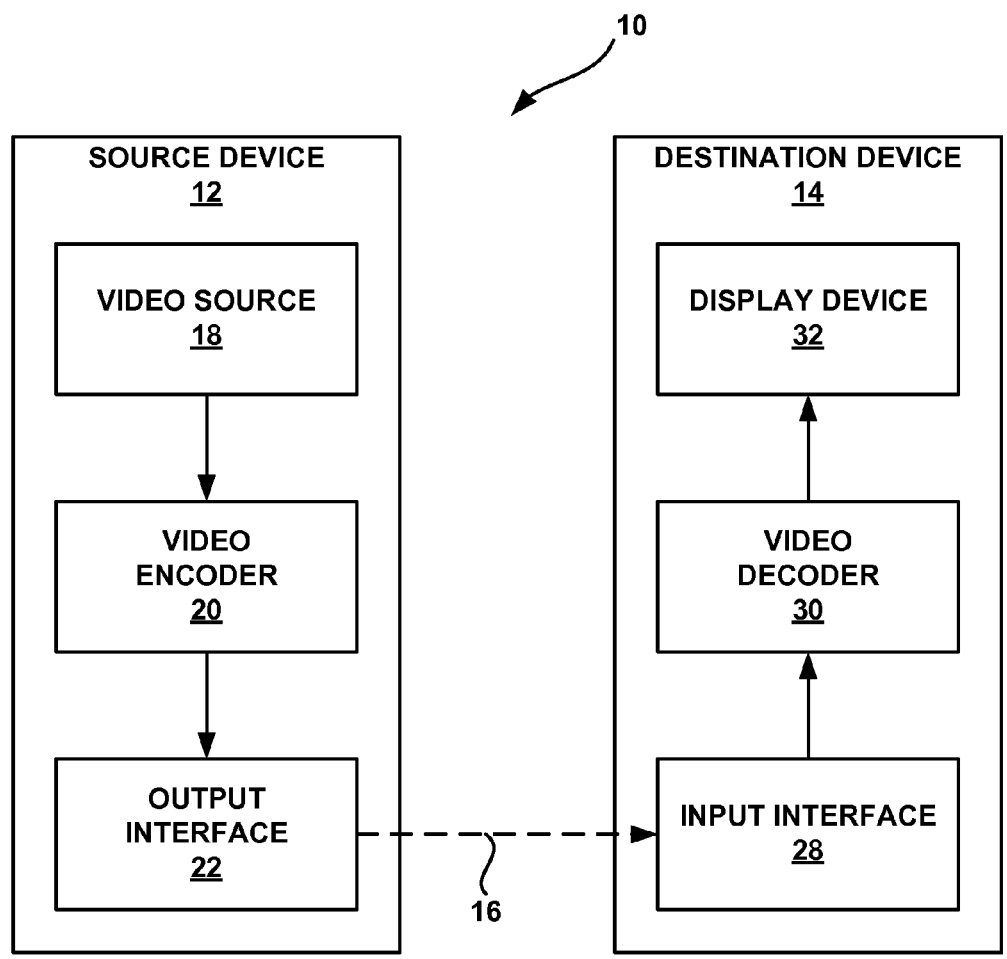
FIG. 1 is a block diagram illustrating an example video coding system that may utilize the techniques of this disclosure.

A picture may include an array of luma (Y) samples and two arrays of chrominance samples. Each sample in the first array of chrominance samples (e.g., U samples) may indicate a difference between a blue component of a pixel and a luma sample for the pixel. For this reason, a U sample may also be referred to as a Cb sample. Each sample in the second array of chrominance samples (e.g., V samples) may indicate a difference between a red sample of a pixel and a luma sample for the pixel. For this reason, a V sample may also be referred to as a Cr sample. The arrays of chrominance samples may be down-sampled relative to the block of luma samples. Thus, in some examples, the arrays of chrominance samples may be half as wide and half as tall, in terms of samples, as the array of luma samples.

A coding unit (CU) may be associated with a block of luma samples and two blocks of chrominance samples that correspond to the same region of a picture. A video encoder may generate luma, Cb and Cr transform blocks for the CU by determining differences between luma, Cb and Cr samples in predictive luma, Cb and Cr blocks for prediction units (PUs) of the CU and corresponding luma, Cb and Cr samples in the initial luma, Cb and Cr coding blocks for the CU. A transform block may be a rectangular block of samples on which the same transform is applied. A video encoder may decompose the luma, Cb and Cr transform blocks associated with a CU into one or more smaller luma, Cb and Cr transform blocks, each of which is associated with a transform unit (TU) of the CU.

The video encoder may apply one or more transforms to the luma, Cb and Cr transform blocks of a TU in order to generate luma, Cb and Cr coefficient blocks. The coefficient blocks may be two-dimensional blocks of transform coefficients. Some of the luma, Cb and Cr coefficient blocks do not include any non-zero transform coefficients, meaning those coefficient blocks include only zero transform coefficients. For ease of explanation, this disclosure may refer to a coefficient block as a significant coefficient block if the coefficient block includes one or more non-zero transform coefficients. If a coefficient block does not include any non-zero transform coefficients (i.e., the coefficient block only includes zero-valued transform coefficients), it may be more efficient for the video encoder to generate a flag (i.e., a coded block flag (CBF)) that indicates that the coefficient block is not significant than to signal each of the zero-valued transform coefficients of the coefficient block.

The video encoder may generate data that represent a residual quad tree (RQT) for the CU. The RQT may also be referred to as a transform tree. The RQT for the CU comprises a set of RQT nodes. Each of the RQT nodes corresponds to a region within the region associated with the CU. A root RQT node corresponds to the region associated with the CU. Leaf RQT nodes correspond to the TUs of the CU. Leaf RQT nodes may be associated with luma CBFs that indicate whether the leaf RQT nodes are associated with significant luma coefficient blocks. In this disclosure, a luma CBF may also be referred to as a Y CBF and a luma coefficient block may be referred to as a Y coefficient block. A luma coefficient block is a coefficient block based on a luma transform block.

In addition to luma CBFs, RQT nodes may also be associated with Cb CBFs and Cr CBFs. A Cb CBF of a RQT node indicates whether the RQT node, or any descendant RQT node of the RQT node, is associated with a significant Cb coefficient block. A Cb coefficient block is a coefficient block based on a Cb transform block. A first RQT node may be a descendant RQT node of a second RQT node if the second RQT node is the root RQT node or there is a path through the RQT from the first RQT node to the root RQT node that passes through the second RQT node and does not pass through any RQT node more than once. If the Cb CBF of a RQT node indicates that the RQT node, and each descendant RQT node of the RQT node, is not associated with a significant Cb coefficient block, no descendant RQT node of the RQT node is associated with a Cb CBF. A Cr CBF of a RQT node indicates whether the RQT node, or any descendant RQT node of the RQT node, is associated with a significant Cr coefficient block. A Cr coefficient block is a coefficient block based on a Cr transform block. If the Cr CBF of a RQT node indicates that the RQT node, and each descendant RQT node of the RQT node, is not associated with a significant Cr coefficient block, no descendant RQT node of the RQT node is associated with a Cr CBF.

There may be several problems with this system. For example, a video encoder does not split a chroma transform block of an RQT node into smaller chroma transform blocks if the chroma transform block is already at a minimum transform size. However, a luma transform block of the RQT node may be larger than the chroma transform block because the video encoder may down-sample the chroma samples of the picture. Hence, the video encoder may split the luma transform block into luma transform sub-blocks, regardless of whether the chroma transform blocks corresponding to the smaller luma transform blocks would be smaller than the minimum transform size.

Furthermore, in this example, the luma CBFs for the first three child RQT nodes may indicate that none of the first three child RQT nodes is associated with a significant luma coefficient block. In this situation, the video encoder still signals a luma CBF for the fourth RQT node (where "fourth," in this instance, is used in the ordinal sense). However, if none of the RQT node's child RQT nodes are associated with a significant luma coefficient block and the RQT node's chroma coefficient blocks do not split with the RQT node's luma coefficient blocks because the RQT node's chroma coefficient blocks are already at the minimum transform size for chroma transform blocks, there would be no bit rate advantage to generating the child RQT nodes. That is, generating the child RQT nodes may be a waste of bits. Stated another way, if none of the child RQT nodes' luma coefficient blocks are significant and the current RQT node is not associated with a significant chroma coefficient block, it may be wasteful generate the child RQT nodes. Furthermore, if none of the child RQT node's luma coefficient blocks are significant, the current RQT node is associated with a significant chroma coefficient block, and the child RQT nodes' chroma transform blocks would be smaller than the minimum transform size, it may be wasteful to generate the child RQT nodes.

In contrast, if one or more of the child RQT nodes' luma coefficient blocks is significant, it may be efficient to generate the child RQT nodes. Furthermore, if the current RQT node is associated with a significant chroma coefficient block and the sizes of the child RQT nodes' luma transform blocks are larger than the minimum transform size, it may be efficient to generate the child RQT nodes. Note that if the sizes of the child RQT nodes' luma transform blocks are larger than the minimum transform size, the sizes of the child RQT nodes' chroma transform blocks may be at least equal to the minimum transform size. Similarly, if the current RQT node is associated with a significant chroma transform block and if the size of the chroma transform block of the current RQT node is greater than a minimum transform size for chroma transform blocks, it may be efficient to generate the child RQT nodes, even if none of the child RQT nodes is associated with a significant luma coefficient block. Thus, even if none of the child RQT node's luma coefficient blocks are significant, it may still be efficient to generate the child RQT nodes when the current RQT node is associated with a significant chroma coefficient block and the sizes of the child RQT nodes' chroma transform blocks are at least equal to the minimum transform size.

In accordance with the techniques of this disclosure, if the RQT node has three child RQT nodes, the first three child RQT nodes are not associated with significant coefficients, and the RQT node is not associated with any significant chroma coefficient blocks or the size of the child RQT nodes' luma transform blocks are greater than the minimum transform size, the video decoder may infer that the fourth child RQT node is associated with a significant luma coefficient block. The video decoder may make this inference without extracting a luma CBF for the fourth child RQT node from the bitstream. Hence, it may be unnecessary for the video encoder to signal the luma CBF for the fourth child RQT node. This may reduce the bit rate of the bitstream and may increase coding efficiency.

FIG. 1 is a block diagram illustrating an example video coding system 10 that may utilize the techniques of this disclosure. As described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). Channel 16 may include various types of devices, such as routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) and Multiview Video Coding (MVC) extensions. In other examples, video encoder 20 and video decoder 30 may operate according to other video compression standards, including the High Efficiency Video Coding (HEVC) standard presently under development. A draft of the upcoming HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which, as of Mar. 11, 2012, is downloadable from http://phenix.int-evry.fr/jct/doc_end_user/documents/11_Shanghai/wg11/JCTVC-K1003-v8.zip, the entire content of which is incorporated herein by reference. The techniques of this disclosure, however, are not limited to any particular coding standard or technique.

FIG. 1 is merely an example and the techniques of this disclosure may apply to video coding settings (e.g., video encoding or video decoding) that do not necessarily include any data communication between the video encoding device and the video decoding device. In other examples, data is retrieved from a local memory, streamed over a network, or the like. A video encoding device may encode and store data to memory, and/or a video decoding device may retrieve and decode data from memory. In many examples, the video encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which a video decoding device may then retrieve at any time after being stored to this medium.

As mentioned briefly above, video encoder 20 encodes video data. The video data may comprise one or more pictures. Each of the pictures is a still image forming part of a video. When video encoder 20 encodes the video data, video encoder 20 may generate a bitstream. The bitstream may include a sequence of bits that form a coded representation of the video data. The bitstream may include coded pictures and associated data. A coded picture is a coded representation of a picture. The associated data may include sequence parameter sets (SPSs), picture parameter sets (PPSs), and other syntax structures. A SPS may contain parameters applicable to zero or more sequences of pictures. A PPS may contain parameters applicable to zero or more pictures.

A picture may include three sample arrays, denoted $S_L$, $S_{Cb}$, and $S_{Cr}$. $S_L$ is a two-dimensional array (i.e., a block) of luma samples. Luma samples may also be referred to herein as "Y" samples. $S_{Cb}$ is a two-dimensional array of Cb chrominance samples. $S_{Cr}$ is a two-dimensional array of Cr chrominance samples. Chrominance samples may also be referred to herein as "chroma" samples. Cb chrominance samples may be referred to herein as "U samples." Cr chrominance samples may be referred to herein as "V samples."

In some examples, video encoder 20 may down-sample the chroma arrays of a picture (i.e., $S_{Cb}$ and $S_{Cr}$). For example, video encoder 20 may use a YUV 4:2:0 video format, a YUV 4:2:2 video format, or a 4:4:4 video format. In the YUV 4:2:0 video format, video encoder 20 may down-sample the chroma arrays such that the chroma arrays are ½ the height and ½ the width of the luma array. In the YUV 4:2:2 video format, video encoder 20 may down-sample the chroma arrays such that the chroma arrays are ½ the height and the same width as the luma array. In the YUV 4:4:4 video format, video encoder 20 does not down-sample the chroma arrays.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs).

As part of encoding a picture, video encoder 20 may generate encoded representations of each slice of the picture (i.e., coded slices). To generate a coded slice, video encoder 20 may encode a series of CTUs. This disclosure may refer to an encoded representation of a CTU as a coded CTU. In some examples, each of the slices includes an integer number of coded CTUs.

To generate a coded CTU, video encoder 20 may recursively perform quad-tree partitioning on the luma, Cb and Cr coding tree blocks of a CTU to divide the luma, Cb and Cr coding tree blocks into luma, Cb and Cr coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive luma, Cb and Cr blocks for a PU. If video encoder 20 uses intra prediction to generate the predictive luma, Cb and Cr blocks of a PU, video encoder 20 may generate the predictive luma, Cb and Cr blocks of the PU based on decoded luma, Cb and Cr samples of the picture associated with the PU. If video encoder 20 uses inter prediction to generate the predictive luma, Cb and Cr blocks of the PU, video encoder 20 may generate the predictive luma, Cb and Cr blocks of the PU based on decoded luma, Cb and Cr samples of one or more pictures other than the picture associated with the PU.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block indicates a difference between a Cb sample in one of the CU's predictive Cb blocks and a corresponding sample in the CU's original Cb coding block. Video encoder 20 may also generate a Cr residual block for the CU. Each sample in the CU's Cr residual block indicates a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may use a residual quad-tree (RQT) to signal how the luma, Cb and Cr residual blocks of a CU are decomposed into luma, Cb and Cr transform blocks of TUs of the CU. In other words, video encoder 20 may include, in a bitstream, data that represent a RQT that indicates how the CU is decomposed into TUs. The RQT may comprise a hierarchy of RQT nodes. Leaf RQT nodes may correspond to the TUs of the CU. Each RQT node may be associated with a split flag. If the split flag of a RQT node is equal to 1, the RQT node has four child RQT nodes. If the split flag of a RQT node is equal to 0, the RQT node has no child RQT nodes. A first RQT node may be a child RQT node of a second RQT node if the first and second RQT nodes are linked in the RQT and the first RQT node is one level lower in the RQT than the second RQT node. RQT nodes are siblings if they are child RQT nodes of the same parent RQT node. Levels of the RQT may be numbered from 0 upward, with level 0 corresponding to the root node, level 1 corresponding to child RQT nodes of the root RQT node, level 2 corresponding to grandchild RQT nodes of the root RQT node, and so on.

In accordance with the techniques of this disclosure, video encoder 20 may skip encoding of, and video decoder 30 may infer a value for, a coded block flag in certain scenarios. For example, when a luma transform block occurs at a particular level of the RQT hierarchy, and for particular values of CBFs for corresponding luma coefficient blocks and chroma coefficient blocks, the value of the CBF for the luma coefficient block can be inferred by video decoder 30, and therefore, need not be signaled by video encoder 20. Examples of such scenarios are described in greater detail below.

Figure 2A:
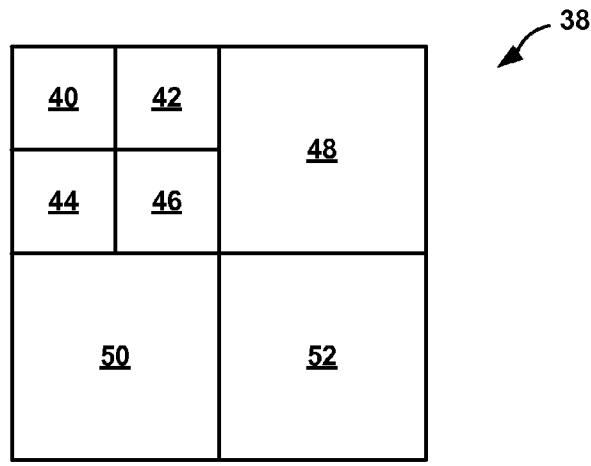
FIG. 2A is a conceptual diagram illustrating an example quad-tree decomposition of a residual block associated with a coding unit (CU).

FIG. 2A is a conceptual diagram illustrating an example quad-tree decomposition of a residual block 38 associated with a CU. In the example of FIG. 2A, residual block 38 is partitioned into a top-left transform block, a top-right transform block, a lower-left transform block, and a lower-right transform block. The inner lines in FIG. 2A indicate one example outcome of transform block decomposition according to a quad-tree structure. This outcome is just one out of many possible decompositions. In the example of FIG. 2A, there are three levels of transform decompositions. At level 0 (i.e., depth 0), residual block 38 is split into four quarter-sized transform blocks. Then, at level 1 (i.e., depth 1), the first quarter-sized transform block is further split into four ¹⁄₁₆-sized transform blocks (split=1). In other words, the top-left transform block is further partitioned into four smaller transform blocks, labeled 40, 42, 44, and 46. There is no further split for sub-blocks 40, 42, 44, and 46. In the example of FIG. 2A, the top-right transform block is labeled 48, the lower-left transform block is labeled 50, and the lower-right transform block is labeled 52. There is no further split for sub-blocks 48, 50, and 52.

Figure 2B:
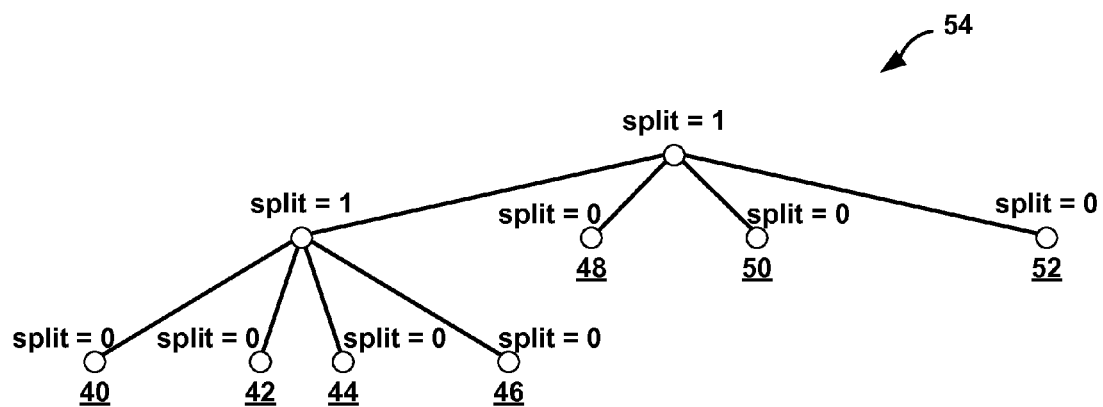
FIG. 2B is a conceptual diagram illustrating the transform decomposition scheme of FIG. 2A as a tree.

FIG. 2B is a conceptual diagram illustrating the quad-tree decomposition scheme of FIG. 2A as a RQT 54. In the example of FIG. 2B, each circle corresponds to a node of RQT 54. Each node is associated with a split flag that indicates whether each transform block associated with the RQT node is split into four smaller transform blocks. The leaf nodes of RQT 54 correspond to transform block 40, 42, 44, 46, 48, 50 and 52 of FIG. 2A. In practice, the determination whether to split a transform block may be based on a rate-distortion optimization.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may perform an entropy encoding operation on the coefficient block. For example, video encoder 20 may perform Context-Adaptive Binary Arithmetic Coding (CABAC) on data in the coefficient blocks. Video encoder 20 may output this entropy encoded data in a bitstream. The bitstream may include an encoded version of the video data.

Video decoder 30 may receive the bitstream generated by video encoder 20. In addition, video decoder 30 may parse the bitstream to extract syntax elements from the bitstream. Video decoder 30 may reconstruct the pictures of the video data based at least in part on the syntax elements extracted from the bitstream. The process to reconstruct the video data may be generally reciprocal to the process performed by video encoder 20. For instance, video decoder 30 may generate predictive luma, Cb, and Cr blocks for the PUs of a CU based at least in part on the syntax elements associated with the CU. In addition, video decoder 30 may inverse quantize luma, Cb and Cr coefficient blocks associated with TUs of the CU. Video decoder 30 may perform inverse transforms on the luma, Cb and Cr coefficient blocks to reconstruct luma, Cb and Cr transform blocks associated with the TUs of the CU. Video decoder 30 may reconstruct the luma, Cb and Cr coding blocks of the CU based at least in part on the predictive luma, Cb and Cr blocks and the luma, Cb and Cr transform blocks.

In some instances, there may be no non-zero transform coefficients in a coefficient block (e.g., a luma, Cb or Cr coefficient block). In other words, all of the transform coefficients in the coefficient block may be equal to zero. This disclosure may use the term "significant coefficient block" to refer to a coefficient block that includes at least one non-zero transform coefficient. If a coefficient block is not significant, there may be no need for video encoder 20 to signal the values of the transform coefficients in the coefficient block.

Accordingly, video encoder 20 may associate luma CBFs with the leaf nodes of the RQT for the CU. For each respective leaf node of the RQT, if the luma CBF of the respective leaf node is equal to 1, the luma coefficient block associated with the respective leaf node is significant. If the luma CBF of the respective leaf node is equal to 0, the luma coefficient block associated with the respective leaf node is not significant. In some examples, the non-leaf nodes of the RQT are not associated with luma CBFs.

Furthermore, RQT nodes may include Cb CBFs and Cr CBFs. Video encoder 20 may encode the Cb CBFs and Cr CBFs in a hierarchical way. If the Cb CBF of a particular RQT node is equal to 0 and the particular RQT node is a leaf node, the particular RQT node is not associated with a significant Cb coefficient block. If the Cb CBF of a particular RQT node is equal to 0 and the particular RQT node is not a leaf node, no descendant RQT node of the particular RQT node is associated with a significant Cb coefficient block. Because video decoder 30 may determine, based on the Cb CBF of the particular RQT node being equal to 0 that no descendant RQT node of the particular RQT node is associated with a significant Cb coefficient block, it may be unnecessary for video encoder 20 to signal Cb CBFs for the descendant RQT nodes of the particular RQT node.

On the other hand, if the Cb CBF of a particular RQT node is equal to 1 and the particular RQT node is a leaf node, the particular RQT node is associated with a significant Cb coefficient block. If the Cb CBF of a particular node is equal to 1 and the particular RQT node is not a leaf node, at least one descendant RQT node of the particular RQT node is associated with a significant Cb coefficient block. Because at least one descendant RQT node of the particular RQT node is associated with a significant Cb coefficient block, each child RQT node of the particular RQT node may be associated with a Cb CBF.

If the Cr CBF of a particular RQT node is equal to 0 and the particular RQT node is a leaf RQT node, the particular RQT node is not associated with a significant Cr coefficient block. If the Cr CBF of a particular RQT node is equal to 0 and the particular RQT node is not a leaf RQT node, no descendant RQT node of the particular RQT node is associated with a significant Cr coefficient block. Because video decoder 30 may determine, based on the Cr CBF of the particular RQT node being equal to 0 that no descendant RQT node of the particular RQT node is associated with a significant Cr coefficient block, it may be unnecessary for video encoder 20 to signal Cr CBFs for the descendant RQT nodes of the particular RQT node.

On the other hand, if the Cr CBF of a particular RQT node is equal to 1 and the particular RQT node is a leaf RQT node, the particular RQT node is associated with a significant Cr coefficient block. If the Cr CBF of a particular RQT node is equal to 1 and the particular RQT node is not a leaf RQT node, at least one descendant RQT node of the particular RQT node is associated with a significant Cr coefficient block. Because at least one descendant RQT node of the particular RQT node is associated with a significant Cr coefficient block, each child RQT node of the particular RQT node may be associated with a Cr CBF.

Figure 3:
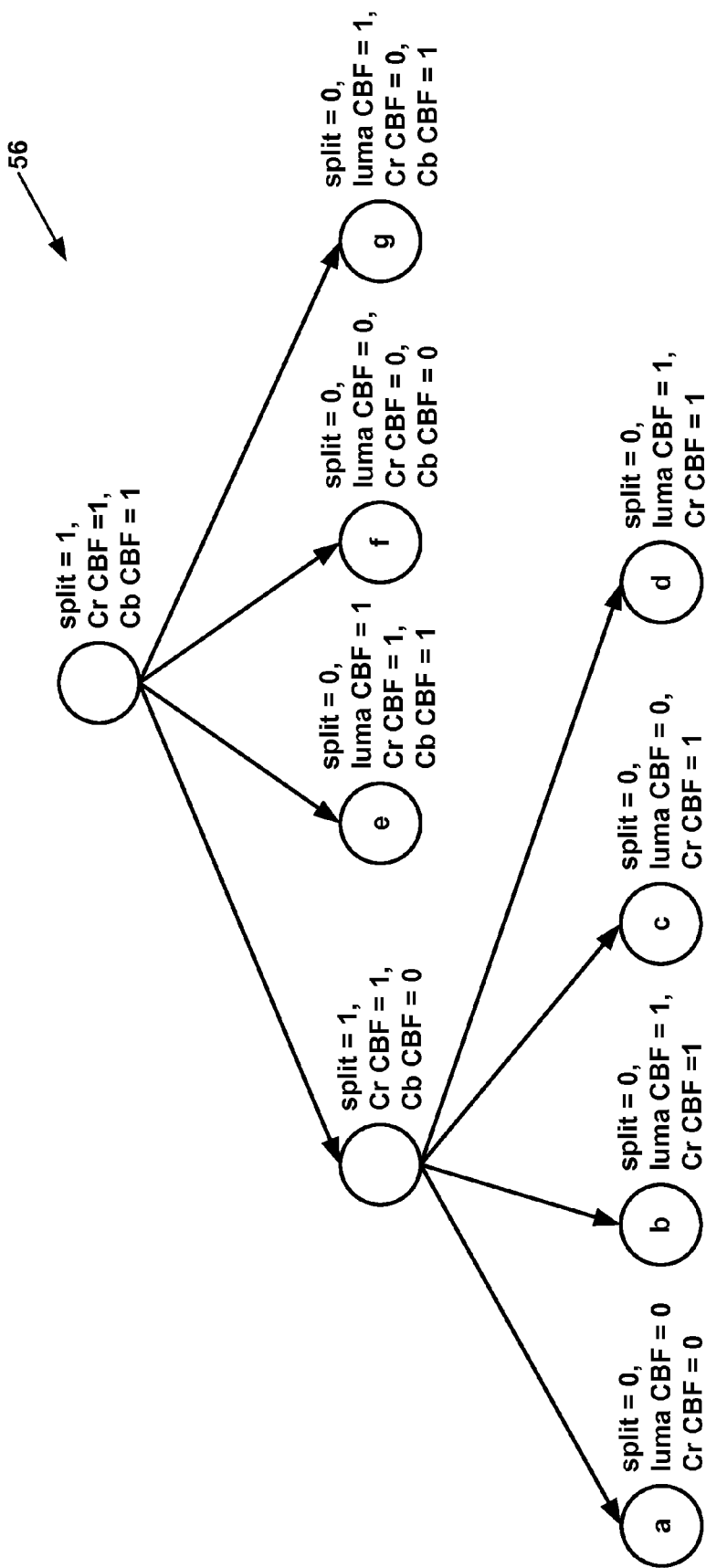
FIG. 3 is a conceptual diagram illustrating an example residual quad-tree (RQT).

FIG. 3 is a conceptual diagram illustrating coding of an example residual quad-tree (RQT) 56. In the example of FIG. 3, each node of RQT 56 is represented as a circle. For each node (i.e., at each level), video encoder 20 encodes a split flag. In the example of FIG. 3, if a split flag is equal to 1, the RQT node has four child RQT nodes and the transform blocks associated with the RQT node are split into four evenly-sized transform blocks (sub-blocks). If the split flag of a RQT node is equal to 0, the RQT node has no child RQT nodes and the transform blocks associated with the RQT node are not split into smaller transform blocks. Each node of RQT 56 may be associated with a Cb CBF (i.e., U CBF) and a Cr CBF (i.e., a V CBF), as described above. In other words, at each level, two other syntax elements may be transmitted. One is Cb CBF and the other one is Cr CBF. These two syntax elements may be encoded in a hierarchical way. If Cb CBF=0, there is no non-zero Cb transform coefficients at the current transform block (if it is not split) or all smaller transform blocks (if the current transform block is split into smaller blocks). In the latter case (i.e., the current transform block is further split), no Cb CBF may need to be transmitted for these further split blocks. The encoding process of Cr CBF may be the same.

If, for one block, the transmitted split flag has value 0, this block is a "leaf node" in the RQT. At the leaf node, a luma CBF is transmitted, and Cb CBF and Cr CBF may also be transmitted (depending on the value of Cb CBFs and Cr CBFs at higher levels of the RQT, i.e., if higher level Cb CBF/Cr CBF is 0, then there may be no need to transmit at this lower level). As illustrated in the example of FIG. 3, each leaf RQT node may be associated with a luma CBF. The luma CBF of a RQT node indicates whether the RQT node is associated with a significant luma coefficient block. Furthermore, if a leaf RQT node is associated with significant luma, Cb, and/or Cr coefficient blocks, the leaf RQT node may be associated with syntax elements that represent the significant luma, Cb, and/or Cr coefficient blocks. In other words, at the leaf RQT node, the transform coefficients are encoded for luma, Cb, and Cr components (CoeffY, CoeffU, CoeffV) if the corresponding flag (luma CBF, Cb CBF, Cr CBF) is not zero.

Figure 4:
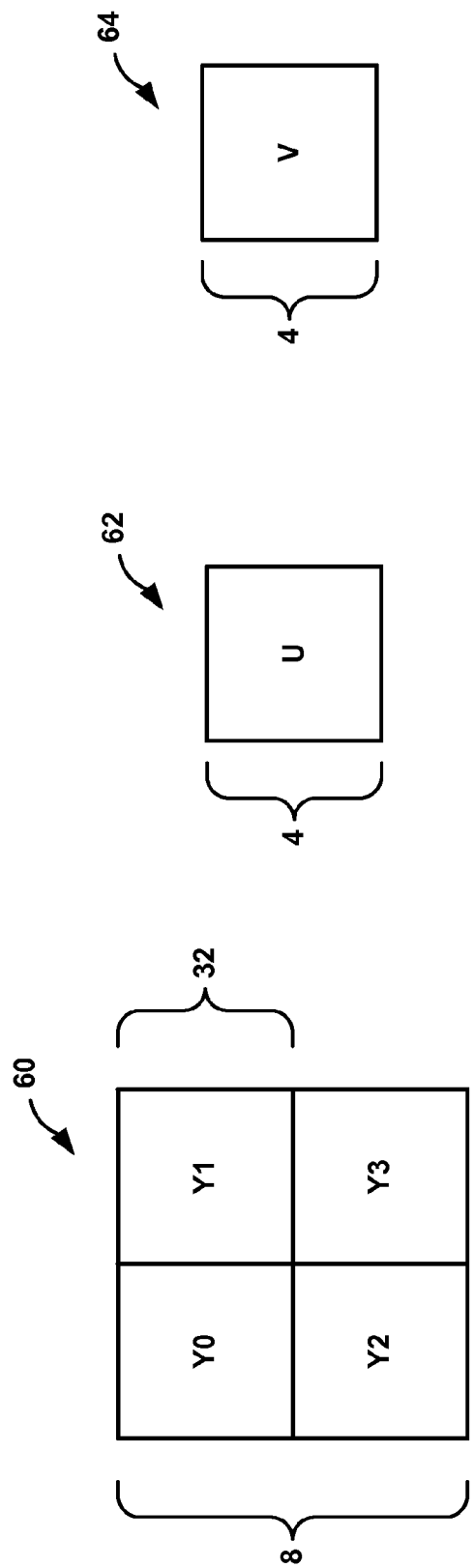
FIG. 4 is a conceptual diagram illustrating an example luma transform block of a CU, a chroma Cb (U) transform block, and a chroma Cr (V) transform block.

FIG. 4 is a conceptual diagram illustrating an example luma (Y) transform block 60 of a CU, a Cb (U) transform block 62, and a Cr (V) transform block 64. In the YUV 4:2:0 video format, video encoder 20 may down-sample the chroma coding blocks of a CU by a factor of 2:1, resulting in Cb and Cr transform blocks for the CU that have half the width and half the height of the corresponding luma transform block for the same CU. That is, at the same depth, the chroma transform block size is ½*½ of the luma transform block size. Because the human visual system is less sensitive to changes in chrominance than to changes in luminance, such down-sampling does not necessarily reduce visual quality.

In some instances, such as that shown in the example of FIG. 4, luma transform block 60 is split, but the corresponding chroma transform blocks 62, 64 are not split. That is, at level k of an RQT, luma transform block 60 is split into four smaller blocks but chroma does not split with luma. Chroma transform blocks 62, 64 may not split because the sizes of chroma transform blocks 62, 64 may already be at the minimum available transform size. Specifically, in the example of FIG. 4, when chroma transform blocks 62, 64 reach minimum transform size of 4×4, chroma transform blocks 62, 64 do not split with luma transform block 60, which is further split into four smaller transform blocks. The minimum transform block size may be decided by encoding parameters input to video encoder 20.

In some cases, video decoder 30 may determine (i.e., infer) the value of a syntax element of a RQT node from one or more already-decoded syntax elements at the same level of the RQT as the RQT node or a higher level of the RQT higher than the level of the RQT node. Determining the values of syntax elements in this way may increase coding efficiency. For example, if a Cb CBF (or a Cr CBF) of a RQT node at level k is equal to 0, then video decoder 30 may determine that all Cb CBFs (or Cr CBFs) at level k+1 and all lower levels are equal to zero. In another example, if a RQT node is associated with a transform block that is larger than a maximum-allowable TU size, video decoder 30 may determine that the split flag of the RQT node is equal to 1. In another example, video decoder 30 may determine that a split flag of a root RQT node is equal to 1 if the CU associated with the root RQT node is partitioned into four PUs and encoded using intra prediction (i.e., the CU is an intra N×N CU).

In another example, video decoder 30 may determine that a split flag of a RQT node is equal to 0 if the size of the luma transform block associated with the RQT node is equal to a minimum-allowable (minimum available) transform block size. In another example, video decoder 30 may determine that a split flag of a RQT node is equal to 0 if the RQT node's depth in the RQT is equal to a maximum allowed depth for the size of the CU associated with the RQT. In another example, if the CU is inter predicted, the first three RQT nodes (sub-blocks of a quarter-split block) at level k of the RQT all have luma CBFs equal to 0, and the Cb CBF and the Cr CBF of the RQT node at level k−1 are both equal to 0, video decoder 30 may infer that the luma CBF of a fourth (i.e., last) RQT node at level k of the RQT is equal to 1.

Some designs of the HEVC codec do not cover all cases where some syntax values of the RQT can be inferred. In particular, such designs do not cover the case when chroma transform does not split with luma (for example, the chroma already reaches the minimum available transform sizes). In this case, video decoder 30 may, in accordance with the techniques of this disclosure, infer the value of a luma CBF.

When the size of the luma transform block of a RQT node is greater than the minimum transform size, the RQT node may include a split flag that indicates whether the RQT node has child RQT nodes. Because the chroma arrays of a picture may be down-sampled, the sizes of the chroma transform blocks of the RQT node may be equal to the minimum transform size while the size of the luma transform block of the RQT node is greater than the minimum transform size. In instances where the sizes of the chroma transform blocks of the RQT node are equal to the minimum transform size, the size of the luma transform block of the RQT node is greater than the minimum transform size, and the RQT node has child RQT nodes, the chroma transform blocks of the RQT node do not split with the luma transform block of the RQT node.

When the chroma transform blocks of the RQT node do not split with the luma transform block of the RQT node, the RQT node is not associated with significant Cb or Cr coefficient blocks, and the current RQT node has child RQT nodes, it may be wasteful to signal the child RQT nodes unless at least one of the child RQT nodes is associated with a significant luma coefficient block. In other words, in the situation where the RQT node is not associated with a significant Cb and Cr coefficient blocks of the RQT node, the split would only happen if one or more of the child RQT node's luma coefficient blocks is significant. Furthermore, in the situation where the RQT node is associated with a significant Cb or Cr coefficient block and the sizes of the child RQT nodes' Cb and Cr transform blocks would be smaller than the minimum transform size, the split would only happen if one or more of the child RQT node's luma coefficient blocks is significant. Hence, in this situation, if the luma coefficient blocks of the first three child RQT nodes are not significant, the luma coefficient block of the fourth child RQT node must be significant. In the example of FIG. 4, splitting the RQT node would only happen when, after splitting, at least one of Y0, Y1, Y2, or Y3 is not zero. This is because if all Y0, Y1, Y2, and Y3 are equal to 0, video encoder 20 would not choose to split the RQT node in order to save the signaling of the four separate luma CBFs, Y0, Y1, Y2, and Y3. As a result the luma CBF of the last 4×4 sub-block (Y3) may be inferred to be equal to 1 if all the first three sub-blocks (Y0, Y1, and Y2) are equal to zero.

That is, in accordance with the techniques of this disclosure, a RQT node in an RQT of a CU may have four child RQT nodes. If video decoder 30 determines that the CU is inter predicted, the first three child RQT nodes are not associated with significant luma coefficient blocks, and the size of the luma transform block of the child RQT nodes is equal to the minimum transform size, video decoder 30 may infer, without extracting the fourth child RQT node's luma CBF from the bitstream, that the fourth child RQT node is associated with a significant luma coefficient block. Otherwise, video decoder 30 may extract the fourth child RQT node's luma CBF from bitstream.

The determination regarding whether to extract the fourth child RQT node's luma CBF from the bitstream may be described using the following pseudo-code:

```
if (PredMode != MODE_INTRA && log2TrafoSize ==
    Log2MinTrafoSize && cbfY0 == 0 && cbfY1 == 0 && cbfY2 == 0) {
    cbfY3 = 1
}
```

In the pseudo-code above, PredMode indicates the prediction mode of the current CU, log 2TrafoSize indicates the size of the fourth child RQT node's luma transform block, Log 2MinTrafoSize indicates the minimum transform size, cbfV0 indicates the first child RQT node's luma CBF, cbfY1 indicates the second child RQT node's luma CBF, cbfY2 indicates the third child RQT node's luma CBF, and cbfY3 indicates the fourth child RQT node's luma CBF.

In some examples, if the split flag of a current RQT node in the RQT of a current CU indicates that the block associated with the current RQT node is split into four sub-blocks, video decoder 30 may extract from the bitstream four child RQT nodes. Each of the four child RQT nodes is associated with an equally-sized block within the block associated with the current RQT node. Otherwise, if the split flag of the current RQT node indicates that the block associated with the current RQT node is not split into four sub-blocks, video decoder 30 may determine whether to extract a luma CBF from the bitstream. In other words, if the current RQT node is a leaf RQT node, video decoder 30 may determine whether to extract a luma CBF from the bitstream.

To determine whether to extract a luma CBF from the bitstream, video decoder 30 may evaluate a first set of conditions. When video decoder 30 evaluates the first set of conditions, video decoder 30 may determine whether a prediction mode of the current CU is the intra prediction mode. In addition, video decoder 30 may determine whether the depth of the current RQT node is equal to 0. Furthermore, video decoder 30 may determine whether the Cb CBF associated with the current RQT node indicates that the current RQT node is associated with a significant Cb coefficient block. Video decoder 30 may also determine whether the Cr CBF associated with the current RQT node indicates that the current RQT node is associated with a significant Cr coefficient block.

If one or more conditions in the first set of conditions are not true, video decoder 30 determines that the bitstream includes syntax elements of the current RQT node's luma CBF. However, if any condition in the first set of conditions is true, video decoder 30 may evaluate a second set of conditions. When video decoder 30 evaluates the second set of conditions, video decoder 30 may determine whether the current RQT node is the fourth child RQT of a parent RQT node. In addition, video decoder 30 may determine whether the prediction mode of the current CU is inter prediction. Furthermore, video decoder 30 may determine whether a size of the current CU's luma coding block is less than or equal to the maximum transform size plus 1 or whether the size of the current RQT node's luma transform block is less than the maximum transform size.

If one or more conditions in the second set of conditions are false, video decoder 30 may extract the current RQT node's luma CBF from the bitstream. If each condition in the second set of conditions is true, video decoder 30 may evaluate a third set of conditions. When video decoder 30 evaluates the third set of conditions, video decoder 30 may determine whether any sibling RQT node of the current RQT node is associated with a significant luma coefficient block. Furthermore, in accordance with the techniques of this disclosure, when video decoder 30 evaluates the third set of conditions, video decoder 30 may determine whether the parent RQT node is associated with a significant Cb coefficient block or a significant Cr coefficient block and the size of the luma transform block associated with the current RQT node is greater than the minimum transform size. If either condition in the third set of conditions is satisfied, video decoder 30 extracts the current RQT node's luma CBF from the bitstream.

On the other hand, if each condition in the second set of conditions is true and neither of the two conditions in the third set of conditions is satisfied, video decoder 30 determines that the luma CBF is omitted from the bitstream. That is, video decoder 30 may determine that the current RQT node's luma CBF is omitted from the bitstream when both of the following conditions are true: (1) no sibling RQT node of the current RQT node is associated with a significant luma coefficient block, and (2) the parent RQT node is not associated with a significant Cb coefficient block and the parent RQT node is not associated with a significant Cr coefficient block or the Cb and Cr transform blocks of the parent RQT node is not split with the luma transform block of the parent RQT node. In some examples, the Cb and Cr transform blocks of the parent RQT node are not split with the luma transform block of the parent RQT node when the size of the block associated with the current RQT is not greater than the minimum transform size or the sizes of the Cb or Cr transform blocks of the parent RQT node are greater than a minimum transform size for chroma transform blocks. When video decoder 30 determines that the luma CBF is omitted from the bitstream or when video decoder 30 determines that the luma CBF indicates that syntax elements of a luma coefficient block are signaled in the bitstream, video decoder 30 may extract the syntax elements of the luma coefficient block from the bitstream.

In this way, video decoder 30 may determine whether a first condition is satisfied. The first condition is satisfied when any sibling RQT node of a current RQT node of a RQT of a CU is associated with a significant luma coefficient block. In addition, video decoder 30 may determine whether a second condition is satisfied. The second condition is satisfied when a chroma transform block of a parent RQT node of the current RQT node is significant and the chroma transform block of the parent RQT node is split with a luma transform block of the parent RQT node. In response to determining that neither the first nor the second condition is satisfied, video decoder 30 may determine that a luma CBF is omitted from the bitstream. When the luma CBF is omitted from the bitstream or when the luma CBF indicates that syntax elements of a luma coefficient block are signaled in the bitstream, video decoder 30 may extract the syntax elements of the luma coefficient block from the bitstream. Video decoder 30 may reconstruct a sample block of the CU based at least in part on the luma coefficient block. In response to determining that either the first condition or the second condition is satisfied, video decoder 30 may extract the luma CBF from the bitstream. When the luma CBF is not omitted from the bitstream and the luma CBF indicates that syntax elements of the luma coefficient block are not signaled in the bitstream, determining that all transform coefficients of the luma coefficient block are non-significant.

Similarly, video encoder 20 may determine whether the first condition is satisfied. In addition, video encoder 20 may determine whether the second condition is satisfied. In response to determining that either the first condition or the second condition is satisfied, video encoder 20 may include a luma CBF in a bitstream, the luma CBF indicating whether the current RQT node is associated with a significant luma coefficient block. In response to determining that neither the first nor the second condition is satisfied, video encoder 20 may not include the luma CBF in the bitstream.

The techniques of this disclosure are not restricted to the YUV 4:2:0 video format, but may also be applicable to the YUV 4:2:2 video format, the YUV 4:4:4 video format, or another video format. Regardless of the video format, the techniques of this disclosure may be applicable when chroma transform blocks do not split with luma transform blocks, which may normally be due to the chroma transform blocks already reaching the minimum available transform sizes for chroma. Thus, a video coding format of a picture used in the techniques of this disclosure may be YUV 4:2:0, 4:2:2, or 4:4:4.

For example, let 4×4 be the minimum allowed transform size. In the YUV 4:2:2 video format, for a 2N×2N luma transform block, the chroma transform block is N×2N. Consequently, an 8×8 luma transform block can be further split into four 4×4 luma transform blocks. However, the corresponding Cb (or Cr) blocks, which are 4×8, cannot be split into four 2×4 Cb or Cr blocks. In this case, the techniques of this disclosure may be used to infer the value of the fourth luma CBF.

In another example, the YUV 4:4:4 video format is used. In this example, 4×4 may be the minimum allowed transform size for luma and 8×8 may be the minimum allowed transform size for chroma. An 8×8 luma transform block can be split into four 4×4 blocks. However, the corresponding chroma transform blocks, which are of size 8×8, cannot be split because of they have already reached the minimum allowed transform for chroma transform blocks. In this case, the techniques of this disclosure may be used to infer the value of the fourth luma CBF. In this disclosure, minimum allowed transform sizes of 4×4 or 8×8 are merely examples. The techniques of this disclosure may be applicable with other minimum allowed transform sizes.

Figure 5:
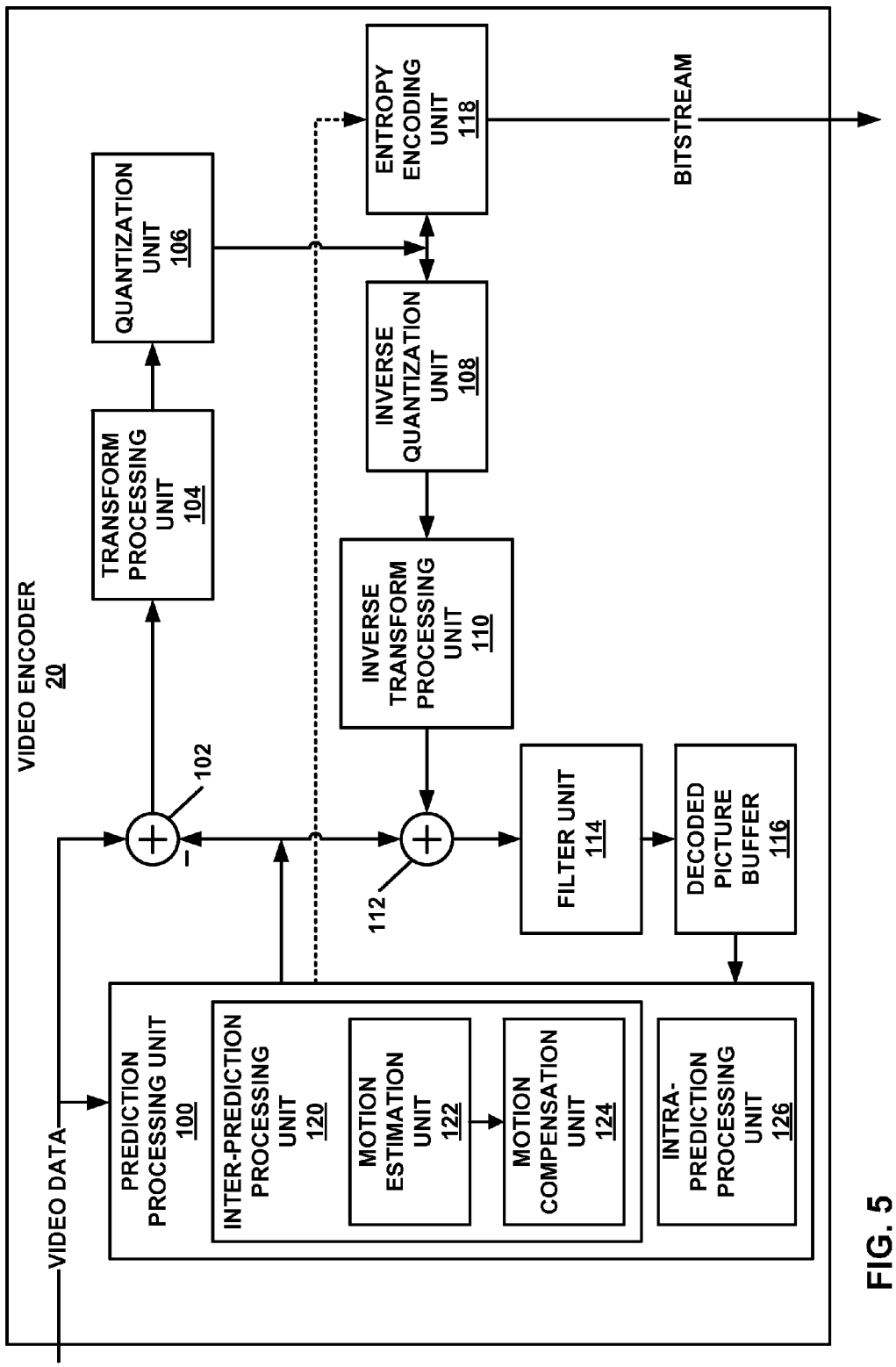
FIG. 5 is a block diagram illustrating an example video encoder that may implement the techniques of this disclosure.

FIG. 5 is a block diagram illustrating an example video encoder 20 that may implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 5, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. The CTUs may be associated with equally-sized regions of the picture. As part of encoding a CTU, prediction processing unit 100 may perform quad-tree partitioning to divide the region associated with the CTU into progressively-smaller regions. The smaller regions may be associated with CUs. For example, prediction processing unit 100 may partition the region associated with a CTU into four equally-sized sub-regions, partition one or more of the sub-regions into four equally-sized sub-sub-regions, and so on.

Video encoder 20 may encode CUs of a CTU to generate encoded representations of the CUs (i.e., coded CUs). As part of encoding a CU, prediction processing unit 100 may partition the region associated with the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive sample blocks that corresponds to the PU and motion information for the PU. Slices may be I slices, P slices, or B slices. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, motion estimation unit 122 may search the reference pictures in a list of reference pictures (e.g., "list 0") for a reference region for the PU. The reference region for the PU may be a region, within a reference picture, that contains sample blocks that most closely corresponds to the sample blocks of the PU. Motion estimation unit 122 may generate a reference picture index (i.e., a reference index) that indicates a position in list 0 of the reference picture containing the reference region for the PU. In addition, motion estimation unit 122 may generate a motion vector that indicates a spatial displacement between the region associated with the PU and the reference region. For instance, the motion vector may be a two-dimensional vector that provides an offset from the coordinates in the current decoded picture to coordinates in a reference picture. Motion estimation unit 122 may output the reference picture index and the motion vector as the motion information of the PU. Motion compensation unit 124 may generate the predictive sample blocks of the PU based on the sample blocks at the reference location indicated by the motion information of the PU.

Thus, for P-mode, video encoder 20 first searches for a block similar to the one being encoded in a previously transmitted reference frame, denoted by $F_{ref}$. Searches are generally restricted to being no more than a certain spatial displacement from the block to be encoded. When the best match, or "prediction," has been identified, it is expressed in the form of a two-dimensional (2D) motion vector $(\Delta x, \Delta y)$ where $\Delta x$ is the horizontal and $\Delta y$ is the vertical displacement. The motion vectors together with the reference frame are used to construct predicted block $F_{pred}$:

$$F_{pred}(x,y)=F_{ref}(x+\Delta x, y+\Delta y)$$

The location of a pixel within the frame is denoted by (x, y).

If a PU is in a B slice, motion estimation unit 122 may perform uni-directional inter prediction or bi-directional inter prediction for the PU. To perform uni-directional inter prediction for the PU, motion estimation unit 122 may search the reference pictures of a first reference picture list ("list 0") or a second reference picture list ("list 1") for a reference region for the PU. Motion estimation unit 122 may output, as the motion information of the PU, a reference picture index that indicates a position in list 0 or list 1 of the reference picture that contains the reference block, a motion vector that indicates a spatial displacement between the region associated with the PU and the reference region for the PU, and a prediction direction indicator that indicates whether the reference picture is in list 0 or list 1. Motion compensation unit 124 may generate the predictive sample blocks of the PU based on the sample blocks at the reference region indicated by the motion information of the PU.

To perform bi-directional inter prediction for a PU, motion estimation unit 122 may search the reference pictures in list 0 for a reference region for the PU and may also search the reference pictures in list 1 for another reference region for the PU. Motion estimation unit 122 may generate reference picture indexes that indicate positions in list 0 and list 1 of the reference pictures that contain the reference regions. In addition, motion estimation unit 122 may generate motion vectors that indicate spatial displacements between the reference regions and the region associated with the PU. The motion information of the PU may include the reference picture indexes and the motion vectors of the PU. Motion compensation unit 124 may generate the predictive sample blocks of the PU based on the sample blocks at the reference region indicated by the motion information of the PU.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the region associated with a CU into regions associated with TUs of the CU. Thus, a TU may be associated with a luma transform block and two chroma transform blocks. The sizes and positions of the luma and chroma transform blocks associated with TUs of a CU may or may not be based on the sizes and positions of prediction blocks associated with the PUs of the CU. A quad-tree structure known as a "residual quad-tree" (RQT) may include nodes associated with each of the regions. The TUs of a CU may correspond to leaf nodes of the RQT.

In accordance with the techniques of this disclosure, transform processing unit 104 may determine whether a first condition is satisfied. The first condition is satisfied when any sibling RQT node of a current RQT node is associated with a significant luma coefficient block. Furthermore, transform processing unit 104 may determine whether a second condition is satisfied. The second condition is satisfied when a parent RQT node of the current RQT node is associated with a significant chroma coefficient block and a size of a luma transform block of the current RQT node is greater than a minimum transform size. In response to determining that either the first condition or the second condition is satisfied, transform processing unit 104 may include a luma CBF in a bitstream. The luma CBF may indicate whether the current RQT node is associated with a significant luma coefficient block.

Transform processing unit 104 may generate coefficient blocks for each TU of a CU by applying one or more transforms to the transform blocks associated with the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block. Thus, for I-mode, P-mode and B-mode, the prediction error, i.e. the difference between the block being encoded and the predicted block, is represented as a set of weighted basis functions of some discrete transform.

In some examples, transform processing unit 104 may determine a transform to apply based at least in part on a size of the transform block to which the transform is to be applied. For example, transform processing unit 104 may apply different transforms depending on whether the transform block is 4×4, 8×8, 16×16, or another size. In some examples, transform processing unit 104 may apply transforms to rectangular-shaped transform blocks, such as transform blocks that are 16×4, 32×8, and so on. In other words, the shape of the transform block does not have to be square always.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform a deblocking operation to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Quantized transform coefficients and motion vectors are examples of "syntax elements." These, plus some control information, may form a complete coded representation of the video sequence. Prior to transmission from video encoder 20 to video decoder 30, all syntax elements may be entropy coded, thereby further reducing the number of bits needed for their representation. Entropy coding is a lossless operation aimed at minimizing the number of bits required to represent transmitted or stored symbols (in our case syntax elements) by utilizing properties of their distribution (some symbols occur more frequently than others).

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 6:
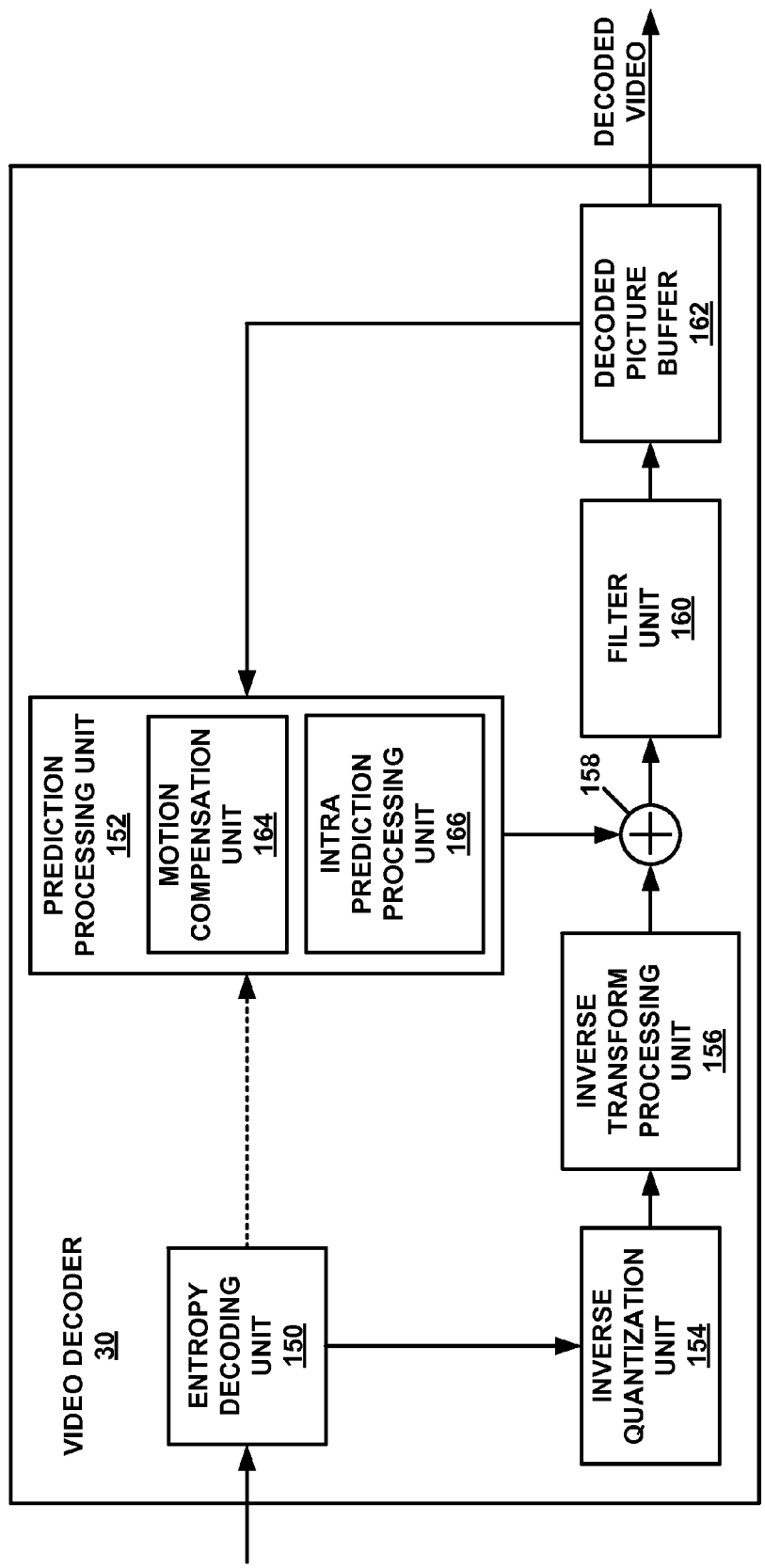
FIG. 6 is a block diagram illustrating an example video decoder that may implement the techniques of this disclosure.

FIG. 6 is a block diagram illustrating an example video decoder 30 that is configured to implement the techniques of this disclosure. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 6, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video decoder 30 may receive a bitstream. Entropy decoding unit 150 may parse the bitstream to extract syntax elements from the bitstream. Entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data based on the syntax elements extracted from the bitstream.

The bitstream may comprise a series of NAL units. The NAL units of the bitstream may include coded slice NAL units. As part of parsing the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

As part of parsing a coded CU from the bitstream, entropy decoding unit 150 may extract, from the bitstream, a transform tree syntax structure from the bitstream. In accordance with the techniques of this disclosure, the transform tree syntax structure may have the syntax shown in Table 1, below.

TABLE 1

| Transform_tree( x0, y0, xC, yC, log2CbSize, log2TrafoWidth, log2TrafoHeight, trafoDepth, blkIdx ) { | Descriptor |
|---|---|
|   if( trafoDepth = = 0 && IntraSplitFlag = = 0 && PredMode != MODE_INTRA && | |
|     !(PartMode = = PART_2Nx2N && merge_flag[x0][y0]) ) | |
|     no_residual_data_flag | ae(v) |
|   if( !no_residual_data_flag ) { | |
|     log2TrafoSize = ( log2TrafoWidth + log2TrafoHeight ) >> 1 | |
|     intraSplitFlag = ( IntraSplitFlag && trafoDepth = = 0 ? 1 : 0 ) | |
|     interSplitFlag = ( max_transform_hierarchy_depth_inter = =0 && | |
|                            PredMode = = MODE_INTER && PartMode != PART_2Nx2N && | |
|                            trafoDepth = = 0 ) | |
|     maxDepth = ( PredMode = = MODE_INTRA ? | |
|                      max_transform_hierarchy_depth_intra + IntraSplitFlag : | |
|                      max_transform_hierarchy_depth_inter + InterSplitFlag ) | |
|     xBase = x0 − ( x0 & ( 1 << log2TrafoWidth ) ) | |
|     yBase = y0 − ( y0 & ( 1 << log2TrafoHeight ) ) | |
|     if( log2TrafoSize <= Log2MaxTrafoSize && | |
|       log2TrafoSize > Log2MinTrafoSize && | |
|       trafoDepth < maxDepth && !intraSplitFlag && !interSplitFlag ) | |
|       split_transform_flag[ x0 ][ y0 ][ trafoDepth ] | ae(v) |
|   if( log2TrafoSize <= Log2MaxTrafoSize ) { | |
|     firstChromaCbf = ( log2TrafoSize = = Log2MaxTrafoSize | | | |
|                          trafoDepth = = 0 ) ? 1 : 0 | |
|     if( firstChromaCbf | | log2TrafoSize > Log2MinTrafoSize ) { | |

TABLE 1-continued

| | Descriptor |
|---|---|
| Transform_tree( x0, y0, xC, yC, log2CbSize, log2TrafoWidth, log2TrafoHeight, trafoDepth, blkIdx ) { | |
|         if( firstChromaCbf \|\| cbf_cb[ xBase ][ yBase ][ trafoDepth − 1 ] ) { | |
|             readCbf = TRUE | |
|             if( blkIdx = = 3 && log2TrafoSize < Log2MaxTrafoSize ) | |
|                 readCbf = cbf_cb[ xBase ][ yBase ][ trafoDepth ] \|\| | |
|                       cbf_cb[ xBase + ( 1 << log2TrafoWidth ) ][ yBase ][ trafoDepth ] \|\| | |
|                       cbf_cb[ xBase ][ yBase + ( 1 << log2TrafoHeight ) ][ trafoDepth ] | |
|             if( !readCbf ) | |
|                 cbf_cb[ x0 ][ y0 ][ trafoDepth ] = 1 | |
|             Else | |
|                 cbf_cb[ x0 ][ y0 ][ trafoDepth ] | ae(v) |
|         } | |
|         if( firstChromaCbf \|\| cbf_cr[ xBase ][ yBase ][ trafoDepth − 1 ] ) { | |
|             readCbf= TRUE | |
|             if( blkIdx = = 3 && log2TrafoSize < Log2MaxTrafoSize ) | |
|                 readCbf = cbf_cr[ xBase ][ yBase ][ trafoDepth ] \|\| | |
|                       cbf_cr[ xBase + ( 1 << log2TrafoWidth ) ][ yBase ][ trafoDepth ] \|\| | |
|                       cbf_cr[ xBase ][ yBase + ( 1 << log2TrafoHeight ) ][ trafoDepth ] | |
|             if( !readCbf ) | |
|                 cbf_cr[ x0 ][ y0 ][ trafoDepth ] = 1 | |
|             Else | |
|                 cbf_cr[ x0 ][ y0 ][ trafoDepth ] | ae(v) |
|         } | |
|     } | |
|     if( split_transform_flag[ x0 ][ y0 ][ trafoDepth ] ) { | |
|         if( InterTUSplitDirection = = 2 ) { | |
|             x1 = x0 + ( ( 1 << log2TrafoWidth ) >> 1 ) | |
|             y1 = y0 | |
|             x2 = x0 | |
|             y2 = y0 + ( ( 1 << log2TrafoHeight ) >> 1 ) | |
|             x3 = x1 | |
|             y3 = y2 | |
|         } else { | |
|             x1 = x0 + ( ( 1 << log2TrafoWidth ) >> 2 ) * InterTUSplitDirection | |
|             y1 = y0 + ( ( 1 << log2TrafoHeight) >> 2 ) * ( 1 − InterTUSplitDirection ) | |
|             x2 = x1 + ( ( 1 << log2TrafoWidth ) >> 2 ) * InterTUSplitDirection | |
|             y2 = y1 + ( ( 1 << log2TrafoHeight) >> 2 ) * ( 1 − InterTUSplitDirection ) | |
|             x3 = x2 + ( ( 1 << log2TrafoWidth ) >> 2 ) * InterTUSplitDirection | |
|             y3 = y2 + ( ( 1 << log2TrafoHeight) >> 2 ) * ( 1 − InterTUSplitDirection ) | |
|             log2TrafoHeight = log2TrafoHeight + 2 * InterTUSplitDirection − 1 | |
|             log2TrafoWidth = log2TrafoWidth − 2 * InterTUSplitDirection + 1 | |
|         } | |
|         transform_tree( x0, y0, x0, y0, log2CbSize, log2TrafoWidth − 1, | |
|             log2TrafoHeight − 1, trafoDepth + 1, 0 ) | |
|         transform_tree( x1, y1, x0, y0, log2CbSize, log2TrafoWidth − 1, | |
|             log2TrafoHeight − 1, trafoDepth + 1, 1 ) | |
|         transform_tree( x2, y2, x0, y0, log2CbSize, log2TrafoWidth − 1, | |
|             log2TrafoHeight − 1, trafoDepth + 1, 2 ) | |
|         transform_tree( x3, y3, x0, y0, log2CbSize, log2TrafoWidth − 1, | |
|             log2TrafoHeight − 1, trafoDepth + 1, 3 ) | |
|     } else { | |
|         if( PredMode = = MODE_INTRA \|\| | |
|             trafoDepth != 0 \|\| | |
|             cbf_cb[ x0 ][ y0 ][ trafoDepth ] \|\| | |
|             cbf_cr[ x0 ][ y0 ][ trafoDepth ] ) { | |
|             readCbf = TRUE | |
|             if( blkIdx = = 3 && | |
|                 PredMode != MODE_INTRA && | |
|                 ( ( log2CbSize <= Log2MaxTrafoSize+l ) \|\| | |
|                   ( log2TrafoSize < Log2MaxTrafoSize ) ) | |
|                 readCbf = cbf_luma[ xBase ][ yBase ][ trafoDepth ] \|\| | |
|                 cbf_luma[ xBase + ( 1 << log2TrafoWidth ) ][ yBase ][ trafoDepth ] \|\| | |
|                 cbf_luma[ xBase ][ yBase + ( 1 << log2TrafoHeight ) ][ trafoDepth ] \|\| | |
|                 ((cbf_cb[ xBase ][ yBase ][ trafoDepth − 1]) \|\| | |
|                 cbf_cr[ xBase ][ yBase ][ trafoDepth − 1]) | |
|                 && (log2TrafoSize> Log2MinTrafoSize)) | |
|             if( !readCbf ) | |
|                 cbf_luma[ x0 ][ y0 ][ trafoDepth ] = 1 | |
|             Else | |
|                 cbf_luma[ x0 ][ y0 ][ trafoDepth ] | ae(v) |
|         } | |
|         transform_unit (x0, y0, xC, yC, log2TrafoWidth, log2TrafoHeight, | |
|             trafoDepth, blkIdx) | |
|     } | |
|   } | |
| } | |

In the example syntax of Table 1, an instance of the transform_tree syntax structure corresponds to a node in a RQT of the CU. As part of parsing a transform_tree syntax structure, entropy decoding unit 150 may extract, from the bitstream, a split_transform_flag syntax element. If the split_transform_flag is equal to 1, the RQT node corresponding to the transform_tree syntax structure has four child RQT nodes. Accordingly, entropy decoding unit 150 may extract, from the bitstream, four instances of the transform_tree syntax structure corresponding to the four child RQT nodes.

Furthermore, in the example syntax of Table 1, entropy decoding unit 150 may extract a Cb CBF syntax element (cbf_cb[x0][y0][trafoDepth]) from the bitstream. cbf_cb[x0][y0][trafoDepth] is the coded block flag for the Cb component (e.g. cbfU) where x0, y0 specifies the location of the current transform block in the CU, and trafoDepth is the level/depth of transform quad-tree (i.e., the RQT). If at trafoDepth—1, the chroma transform block already reaches the minimum available transform block size, the value of cbf_cb[x0][y0][trafoDepth] may be defined to be equal to 0. In addition, entropy decoding unit 105 may extract a Cr CBF syntax element (cbf_cr[x0][y0][trafoDepth]) from the bitstream. cbf_cr[x0][y0][trafoDepth] is the coded block flag for the Cr component (e.g. cbfV) where x0, y0 specifies the location of the current transform block in the CU, and trafoDepth is the level/depth of transform quad-tree. If at trafoDepth–1 chroma transform block already reaches the minimum available transform, the value of cbf_cr[x0][y0][trafoDepth] may be defined to be 0.

In the example syntax of Table 1, video decoder 30 determines whether to extract a luma CBF (cbf_luma[x0] [y0] [trafoDepth]) for the RQT node from the bitstream. cbf_luma[x0] [y0] [trafoDepth] is the coded block flag for the luma component (i.e. cbfY) where x0, y0 specifies the location of the current transform block in the CU, and trafoDepth is the level/depth of transform quad-tree. For instance, cbf_luma[x0] [y0] [trafoDepth] equal to 1 specifies that the luma transform block contains one or more transform coefficient levels not equal to 0. The array coordinates x0, y0 specify the location (x0, y0) of the top-left luma sample of the considered transform block relative to the top-left luma sample of the picture. The array index trafoDepth specifies a subdivision level in a RQT.

To determine whether to extract the luma CBF from bitstream, video decoder 30 evaluates a first set of conditions. In the example syntax of Table 1, the first set of conditions is expressed as:

```
PredMode == MODE_INTRA ||
trafoDepth != 0 ||
cbf_cb[ x0 ][ y0 ][ trafoDepth ] ||
cbf_cr[ x0 ][ y0 ][ trafoDepth ]
```

If no condition in the first set of conditions is satisfied, entropy decoding unit 150 may determine that the luma CBF is omitted from the bitstream and that the bitstream includes syntax elements of a luma coefficient block for the current RQT node. This is because video decoder 30 may infer, if the luma CBF is absent, that the luma CBF is equal to 1. Thus, in response to determining that a prediction mode of the CU is not intra prediction, the current RQT node is a root node of the RQT, the current RQT node is not associated with a significant Cb coefficient block, and the current RQT node is not associated with a significant Cr coefficient block, entropy decoding unit 150 may extract, from the bitstream, the syntax elements of the luma coefficient block for the current RQT node.

Furthermore, if any condition in the first set of conditions is satisfied, video decoder 30 evaluates a second set of conditions. In the example syntax of Table 1, the second set of conditions is expressed as:

```
blkIdx == 3 &&
PredMode != MODE_INTRA &&
( ( log2CbSize <= Log2MaxTrafoSize+1 )||
  ( log2TrafoSize < Log2MaxTrafoSize )
```

If any condition in the second set of conditions is not satisfied, entropy decoding unit 150 may extract a luma CBF for the current RQT node from the bitstream. Thus, entropy decoding unit 150 may extract the luma CBF in response to determining that the current RQT node is not a fourth child RQT node of the parent RQT node or that a prediction mode of the CU is intra prediction, or that a size of the CU is not less than or equal to a maximum transform size and a transform size of the luma transform block of the current RQT node is less than a maximum transform size.

If each condition of the second set of conditions is satisfied, video decoder 30 evaluates a third set of conditions. In the example syntax of Table 1, the third set of conditions is expressed as:

```
readCbf =  cbf_luma[ xBase ][ yBase ][ trafoDepth ] ||
           cbf_luma[ xBase + ( 1 << log2TrafoWidth ) ][ yBase ]
           [ trafoDepth ] || cbf_luma[ xBase ][ yBase +
           ( 1 << log2TrafoHeight ) ][ trafoDepth ] ||
           ( ( cbf_cb[ xBase ][ yBase ][ trafoDepth – 1]||
               cbf_cr[ xBase ][ yBase ][ trafoDepth – 1] )
           && ( log2TrafoSize> Log2MinTrafoSize ) )
```

In the third set of conditions, video decoder 30 determines whether any sibling RQT node of the current RQT node is associated with a significant luma coefficient block by determining whether the luma CBFs for any of the sibling RQT nodes are equal to 1. The luma CBFs for the sibling RQT nodes are denoted as

```
cbf_luma[ xBase ][ yBase ][ trafoDepth ],
cbf_luma[ xBase + ( 1 << log2TrafoWidth ) ][ yBase ][ trafoDepth ], and
cbf_luma[ xBase ][ yBase + ( 1 << log2TrafoHeight ) ][ trafoDepth ].
```

Furthermore, in accordance with the techniques of this disclosure, when video decoder 30 evaluates the third set of conditions, video decoder 30 may determine whether the parent RQT node of the current RQT node is associated with a significant Cb coefficient block or a significant Cr coefficient block and the size of the block associated with the current RQT node is greater than the minimum TU block size. The parent RQT node is one level higher in the RQT from the current RQT node. Video decoder 30 may determine whether the parent RQT node is associated with a significant Cb coefficient block by determining whether cbf_cb[xBase][yBase][trafoDepth–1] is equal to 1. Video decoder 30 may determine whether the parent RQT node is associated with a significant Cr coefficient block by determining whether cbf_cr[xBase][yBase][trafoDepth–1] is equal to 1. In addition, video decoder 30 may determine whether the size of the block associated with the current RQT node (i.e., log 2TrafoSize) is greater than the minimum transform size (i.e., Log 2MinTrafoSize).

If the readCbf variable evaluates to true, video decoder 30 extracts cbf_luma[x0] [y0] [trafoDepth] from the bitstream. Otherwise, if the readCbf variable evaluates to false, video decoder 30 may automatically determine, without extracting cbf_luma[x0] [y0] [trafoDepth] from the bitstream, that cbf_luma[x0] [y0] [trafoDepth] is equal to 1. As indicated above, cbf_luma[x0] [y0] [trafoDepth]=1 indicates that the current RQT node is associated with a significant luma coefficient block.

In this way, entropy decoding unit 150 may determine whether a first condition is satisfied. The first condition is satisfied when any sibling RQT node of a current RQT node is associated with a significant luma coefficient block. In addition, entropy decoding unit 150 may determine whether a second condition is satisfied. The second condition is satisfied when a chroma transform block of a parent RQT node of the current RQT node is significant and the chroma transform block of the parent RQT node is split with a luma transform block of the parent RQT node. In response to determining that neither the first nor the second condition is satisfied, entropy decoding unit 150 may determine, without extracting from a bitstream a luma CBF that indicates whether the current RQT node is associated with a significant luma coefficient block, that the current RQT node is associated with the significant luma coefficient block.

Furthermore, entropy decoding unit 150 may determine values of a first luma CBF, a second luma CBF, and a third luma CBF. The first luma CBF may indicate whether a first one of the sibling RQT nodes is associated with a first significant luma coefficient block, the second luma CBF may indicate whether a second one of the sibling RQT nodes is associated with a second significant luma coefficient block, and the third luma CBF may indicate whether a third one of the sibling RQT nodes is associated with a third significant luma coefficient block. Entropy decoding unit 150 may determine whether the first condition is satisfied in part by determining, based at least in part on the first luma CBF, the second luma CBF and the third luma CBF, whether any of the sibling RQT nodes is associated with a significant luma coefficient block.

To determine whether the second condition is satisfied, entropy decoding unit 150 may determine whether a Cb CBF of the parent RQT node indicates that the parent RQT node is associated with a significant Cb coefficient block and may determine whether a Cr CBF of the parent RQT node indicates that the parent RQT node is associated with a significant Cr coefficient block. Furthermore, to determine whether the second condition is satisfied, entropy decoding unit 150 may determine whether the size of the luma transform block of the current RQT node is greater than the minimum transform size.

Video encoder 20 may make similar determinations to determine whether to include the luma CBF in the bitstream.

In addition to parsing syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks associated with the CU. That is, a sample block in a current frame may be obtained by first constructing the sample block's prediction in the same manner as in video encoder 20, and by adding to the prediction the compressed prediction error. The compressed prediction error may be found by weighting the transform basis functions using the quantized transform coefficients. The difference between the reconstructed frame and the original frame may be called reconstruction error.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive sample blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements extracted from the bitstream.

Prediction processing unit 152 may construct a first reference picture list (list 0) and a second reference picture list (list 1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. In particular, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Figure 7:
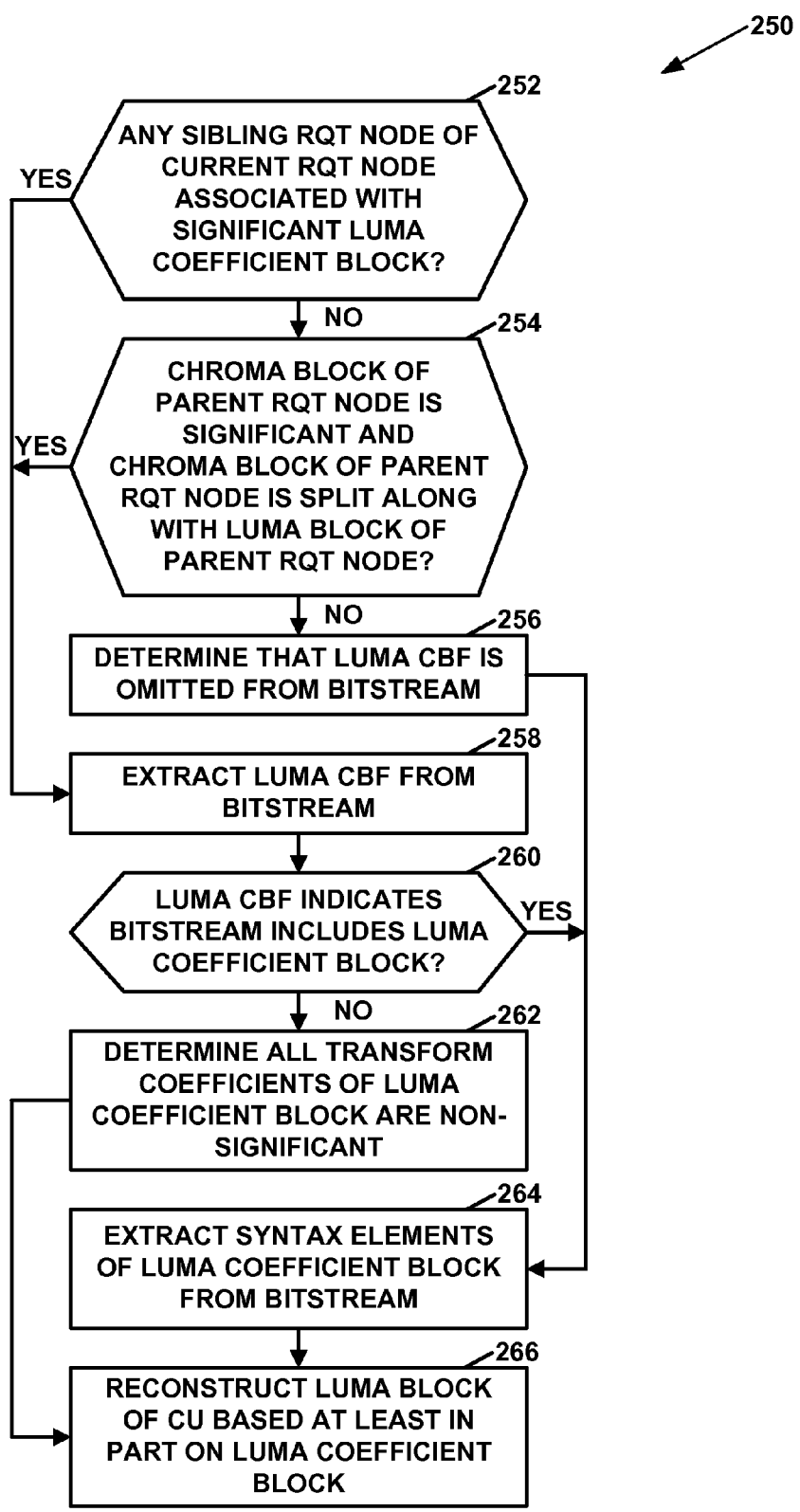
FIG. 7 is a flowchart illustrating an example operation of a video decoder, in accordance with one or more techniques of this disclosure.

FIG. 7 is a flowchart illustrating an example operation 250 of video decoder 30, in accordance with the techniques of this disclosure. The flowchart of FIG. 7 and the flowcharts of the following figures are provided as examples. In other examples, the flowcharts may include more, fewer, or different steps.

In the example of FIG. 7, video decoder 30 may determine whether any sibling RQT node of a current RQT node of a RQT of a current CU is associated with a significant luma coefficient block (252). In response to determining that no sibling RQT node of the current RQT node is associated with a significant luma coefficient block ("NO" of 252), video decoder 30 may determine whether a chroma transform block of a parent RQT node of the current RQT node is significant and the chroma transform block of the parent RQT node is split with a luma transform block of the parent RQT node (254). The chroma transform block of the parent RQT node may split along with the luma transform block of the parent RQT node when a size of a luma transform block of the current RQT node is greater than a minimum transform size or when a size of the chroma transform block of the parent RQT node is greater than a minimum transform size for chroma transform blocks In response to determining that the chroma transform block of the parent RQT node of the current RQT node is not significant or the chroma transform block of the parent RQT node is not split with the luma transform block of the parent RQT node ("NO" of 254), video decoder 30 may determine that a luma CBF for the current RQT node is omitted from the bitstream (256). The luma CBF may indicate whether the current RQT node is associated with the significant luma coefficient block.

On the other hand, when one or more sibling RQT nodes of the current RQT node are associated with a significant luma coefficient block ("YES" of 252) or when a chroma transform block of the parent RQT node of the current RQT node is significant and the chroma transform block of the parent RQT node is split with the luma transform block of the parent RQT node ("YES" of 254), video decoder 30 may extract the luma CBF from the bitstream (258). Video decoder 30 may determine whether the luma CBF indicates that the bitstream includes syntax elements of a luma coefficient block associated with the current RQT node (260). The syntax elements of the luma coefficient block may include syntax elements that define transform coefficient levels (e.g., coeff_abs_level_greater1_flag, coeff_abs_level_greater2_flag, coeff_sign_flag, coeff_abs_level_remaining, etc), a last significant transform coefficient, and so on. A residual data syntax structure may include the syntax elements of the luma coefficient block. When video decoder 30 determines that the luma CBF indicates that syntax elements of a luma coefficient block are omitted from the bitstream ("NO" of 260), video decoder 30 may determine that all transform coefficients of a luma coefficient block associated with the current RQT node are non-significant (e.g., equal to 0) (262).

On the other hand, in response to determining that the luma CBF for the current RQT node is omitted from the bitstream (256) or in response to determining that the luma CBF indicates that the bitstream includes syntax elements of a luma coefficient block associated with the current RQT node ("YES" of 260), video decoder 30 may extract, from the bitstream, the syntax elements of the luma coefficient block associated with the current RQT node (264).

After extracting the syntax elements of the luma coefficient block or after determining that all transform coefficients of the luma coefficient block are non-significant, video decoder 30 may reconstruct a luma coding block of the current CU based at least in part on the luma coefficient block (266). For instance, to reconstruct the luma coding block of the current CU, video decoder 30 may perform an inverse transform to the luma coefficient block to generate a transform block. Video decoder 30 may reconstruct at least a portion of the luma coding block of the current CU by adding luma samples of the transform block to corresponding samples of a predictive luma block of the current CU.

Figure 8:
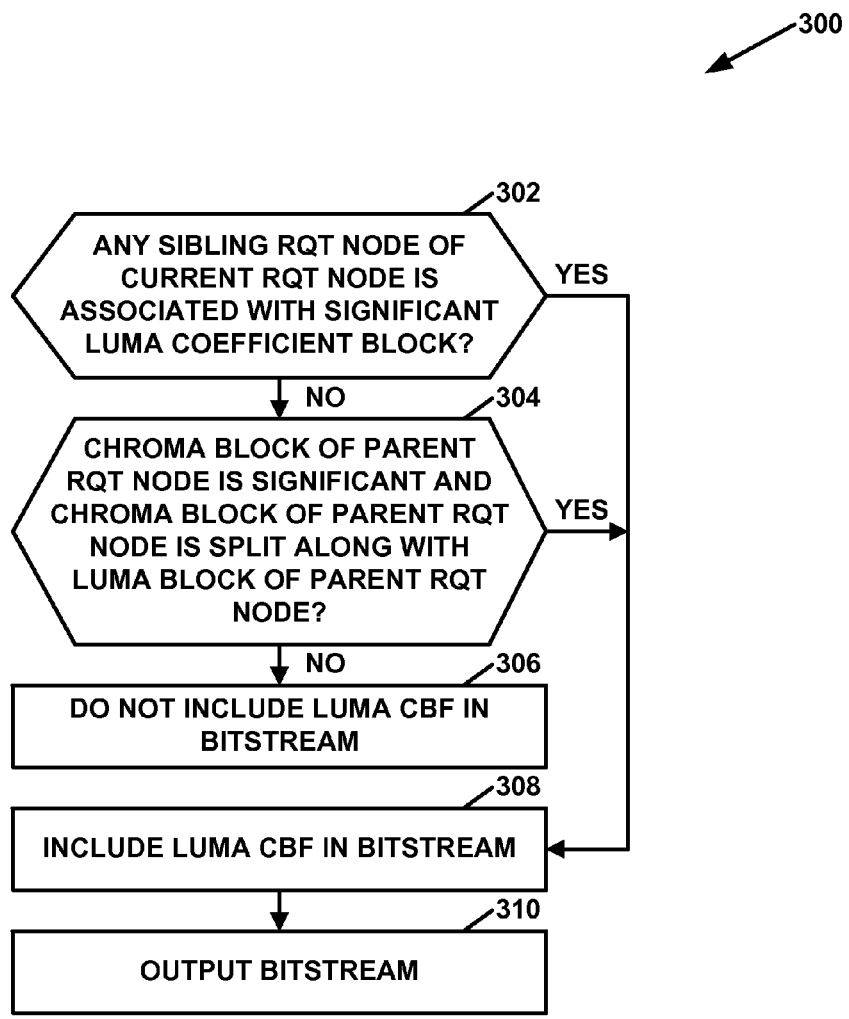
FIG. 8 is a flowchart illustrating an example operation of a video encoder, in accordance with one or more techniques of this disclosure.

FIG. 8 is a flowchart illustrating an example operation 300 of video encoder 20, in accordance with one or more techniques of this disclosure. As illustrated in the example of FIG. 8, video encoder 20 may determine whether any sibling RQT node of a current RQT node is associated with a significant luma coefficient block (302). In response to determining that no sibling RQT node of the current RQT node is associated with a significant luma coefficient block ("NO" of 302), video encoder 20 may determine whether a chroma transform block of a parent RQT node of the current RQT node is significant and the chroma transform block of the parent RQT node is split with a luma transform block of the parent RQT node (304). In some instances, the chroma transform block of the parent RQT node may split along with the luma transform block of the parent RQT node when a size of a luma transform block of the current RQT node is greater than a minimum transform size or when a size of the chroma transform block of the parent RQT node is greater than a minimum transform size for chroma transform blocks.

In response to determining that the parent RQT node of the current RQT node is not associated with a significant chroma coefficient block or the chroma transform block of the parent RQT node is not split along with the luma transform block of the parent RQT node ("NO" of 304), video encoder 20 does not include the luma CBF in the bitstream (306). In other words, video encoder 20 omits the luma CBF of the current RQT node from the bitstream. On the other hand, when one or more sibling RQT nodes of the current RQT node are associated with a significant luma coefficient block ("YES" of 302) or when the parent RQT node of the current RQT node is associated with a significant chroma coefficient block and the size of the luma transform block of the current RQT node is greater than the minimum transform size ("YES" of 304), video encoder 20 may include the luma CBF from the bitstream (308). Video encoder 20 may output the bitstream (310).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining whether a first condition is satisfied, wherein the first condition is satisfied when any sibling residual quad tree (RQT) node of a current RQT node of a RQT of a coding unit (CU) is associated with a significant luma coefficient block;
    determining whether a second condition is satisfied, wherein the second condition is satisfied when a chroma transform block of a parent RQT node of the current RQT node is significant and the chroma transform block of the parent RQT node is split with a luma transform block of the parent RQT node;
    when neither the first nor the second condition is satisfied, determining that a luma coded block flag (CBF) is omitted from a bitstream;
    when the luma CBF is omitted from the bitstream or when the luma CBF indicates that syntax elements of a luma coefficient block are signaled in the bitstream, extracting the syntax elements of the luma coefficient block from the bitstream; and
    reconstructing a sample block of the CU based at least in part on the luma coefficient block.

2. The method of claim 1, further comprising in response to determining that either the first condition or the second condition is satisfied, extracting the luma CBF from the bitstream.

3. The method of claim 1, wherein the chroma transform block of the parent RQT node is split with the luma transform block of the parent RQT node when a size of a luma transform block of the current RQT node is greater than a minimum transform size.

4. The method of claim 1, wherein the chroma transform block of the parent RQT node is split with the luma transform block of the parent RQT node when a size of the chroma transform block of the parent RQT node is greater than a minimum transform size for chroma transform blocks.

5. The method of claim 1, further comprising when the luma CBF is not omitted from the bitstream and the luma CBF indicates that syntax elements of the luma coefficient block are not signaled in the bitstream, determining that all transform coefficients of the luma coefficient block are non-significant.

6. The method of claim 1, wherein:
    the luma CBF is a fourth luma CBF,
    the significant luma coefficient block is a fourth significant luma coefficient block,
    the method further comprises determining values of a first luma CBF, a second luma CBF, and a third luma CBF, the first luma CBF indicating whether a first one of the sibling RQT nodes is associated with a first significant luma coefficient block, the second luma CBF indicating whether a second one of the sibling RQT nodes is associated with a second significant luma coefficient block, and the third luma CBF indicating whether a third one of the sibling RQT nodes is associated with a third significant luma coefficient block, and
    determining whether the first condition is satisfied comprises determining, based at least in part on the first luma CBF, the second luma CBF and the third luma CBF, whether any of the sibling RQT nodes is associated with a significant luma coefficient block.

7. The method of claim 1, wherein determining whether the second condition is satisfied comprises determining that the second condition is satisfied when:
    a Cb CBF of the parent RQT node indicates that the parent RQT node is associated with a significant Cb coefficient block or a Cr CBF of the parent RQT node indicates that the parent RQT node is associated with a significant Cr coefficient block; and
    the size of the luma transform block of the current RQT node is greater than the minimum transform size.

8. The method of claim 1, wherein:
    the current RQT node, the sibling RQT nodes and the parent RQT node are in a RQT of a coding unit (CU) of a picture; and
    a video coding format of the picture is YUV 4:2:0, 4:2:2, or 4:4:4.

9. The method of claim 1, further comprising, when the current RQT node is associated with a significant luma coefficient block:
extracting, from the bitstream, transform coefficient levels of the significant luma coefficient block;
inverse quantizing the transform coefficient levels;
applying an inverse transform to the transform coefficient levels to generate a transform block;
generating, based at least in part on the transform block, a coding block; and
outputting the coding block.

10. A video decoding device comprising:
a data storage medium storing video data; and
one or more processors, coupled to the data storage medium, the one or more processors configured to:
determine whether a first condition is satisfied, wherein the first condition is satisfied when any sibling residual quad tree (RQT) node of a current RQT node of a RQT of a coding unit (CU) is associated with a significant luma coefficient block;
determine whether a second condition is satisfied, wherein the second condition is satisfied when a chroma transform block of a parent RQT node of the current RQT node is significant and the chroma transform block of the parent RQT node is split with a luma transform block of the parent RQT node;
when neither the first nor the second condition is satisfied, determine that a luma coded block flag (CBF) is omitted from a bitstream;
when the luma CBF is omitted from the bitstream or when the luma CBF indicates that syntax elements of a luma coefficient block are signaled in the bitstream, extract the syntax elements of the luma coefficient block from the bitstream; and
reconstruct a sample block of the CU based at least in part on the luma coefficient block.

11. The video decoding device of claim 10, wherein the one or more processors are further configured to extract, in response to determining that either the first condition or the second condition is satisfied, the luma CBF from the bitstream.

12. The video decoding device of claim 10, wherein the chroma transform block of the parent RQT node is split with the luma transform block of the parent RQT node when a size of a luma transform block of the current RQT node is greater than a minimum transform size.

13. The video decoding device of claim 10, wherein the chroma transform block of the parent RQT node is split with the luma transform block of the parent RQT node when a size of the chroma transform block of the parent RQT node is greater than a minimum transform size for chroma transform blocks.

14. The video decoding device of claim 10, wherein the one or more processors are configured such that, when the luma CBF is not omitted from the bitstream and the luma CBF indicates that syntax elements of the luma coefficient block are not signaled in the bitstream, the one or more processors determine that all transform coefficients of the luma coefficient block are non-significant.

15. The video decoding device of claim 10, wherein:
the luma CBF is a fourth luma CBF,
the significant luma coefficient block is a fourth significant luma coefficient block,
the one or more processors are further configured to determine values of a first luma CBF, a second luma CBF, and a third luma CBF, the first luma CBF indicating whether a first one of the sibling RQT nodes is associated with a first significant luma coefficient block, the second luma CBF indicating whether a second one of the sibling RQT nodes is associated with a second significant luma coefficient block, and the third luma CBF indicating whether a third one of the sibling RQT nodes is associated with a third significant luma coefficient block, and
to determine whether the first condition is satisfied, the one or more processors determine, based at least in part on the first luma CBF, the second luma CBF and the third luma CBF, whether any of the sibling RQT nodes is associated with a significant luma coefficient block.

16. The video decoding device of claim 10, wherein to determine whether the second condition is satisfied, the one or more processors determine that the second condition is satisfied when:
a Cb CBF of the parent RQT node indicates that the parent RQT node is associated with a significant Cb coefficient block or a Cr CBF of the parent RQT node indicates that the parent RQT node is associated with a significant Cr coefficient block; and
the size of the luma transform block of the current RQT node is greater than the minimum transform size.

17. The video decoding device of claim 10, wherein:
the current RQT node, the sibling RQT nodes and the parent RQT node are in a RQT of a coding unit (CU) of a picture; and
a video coding format of the picture is YUV 4:2:0, 4:2:2, or 4:4:4.

18. The video decoding device of claim 10, wherein the one or more processors are configured such that when the current RQT node is associated with a significant luma coefficient block, the one or more processors:
extract, from the bitstream, transform coefficient levels of the significant luma coefficient block;
inverse quantize the transform coefficient levels;
apply an inverse transform to the transform coefficient levels to generate a transform block;
generate, based at least in part on the transform block, a coding block; and
output the coding block.

19. A video decoding device comprising:
means for determining whether a first condition is satisfied, wherein the first condition is satisfied when any sibling residual quad tree (RQT) node of a current RQT node of a RQT of a coding unit (CU) is associated with a significant luma coefficient block;
means for determining whether a second condition is satisfied, wherein the second condition is satisfied when a chroma transform block of a parent RQT node of the current RQT node is significant and the chroma transform block of the parent RQT node is split with a luma transform block of the parent RQT node;
means for determining, when neither the first nor the second condition is satisfied, that a luma coded block flag (CBF) is omitted from a bitstream, means for extracting, when the luma CBF is omitted from the bitstream or when the luma CBF indicates that syntax elements of a luma coefficient block are signaled in the bitstream, the syntax elements of the luma coefficient block from the bitstream; and
means for reconstructing a sample block of the CU based at least in part on the luma coefficient block.

20. The video decoding device of claim 19, further comprising means for extracting, in response to determining that either the first condition or the second condition is satisfied, the luma CBF from the bitstream.

21. A non-transitory computer-readable storage medium having instructions stored thereon that, when executed by one or more processors of a video decoding device, configure the video decoding device to:
- determine whether a first condition is satisfied, wherein the first condition is satisfied when any sibling residual quad tree (RQT) node of a current RQT node of a RQT of a coding unit (CU) is associated with a significant luma coefficient block;
- determine whether a second condition is satisfied, wherein the second condition is satisfied when a chroma transform block of a parent RQT node of the current RQT node is significant and the chroma transform block of the parent RQT node is split with a luma transform block of the parent RQT node;
- determine, when neither the first nor the second condition is satisfied, that a luma coded block flag (CBF) is omitted from a bitstream;
- extract, when the luma CBF is omitted from the bitstream or when the luma CBF indicates that syntax elements of a luma coefficient block are signaled in the bitstream, the syntax elements of the luma coefficient block from the bitstream; and
- reconstruct a sample block of the CU based at least in part on the luma coefficient block.

22. The non-transitory computer-readable storage medium of claim 21, wherein execution of the instruction further configures the video decoding device to extract, in response to determining that either the first condition or the second condition is satisfied, the luma CBF from the bitstream.

23. A method of encoding video data, the method comprising:
- determining whether a first condition is satisfied, wherein the first condition is satisfied when any sibling residual quad tree (RQT) node of a current RQT node is associated with a significant luma coefficient block;
- determining whether a second condition is satisfied, wherein the second condition is satisfied when a chroma transform block of a parent RQT node of the current RQT node is significant and the chroma transform block of the parent RQT node is split with a luma transform block of the parent RQT node;
- in response to determining that either the first condition or the second condition is satisfied, including a luma coded block flag (CBF) in a bitstream, the luma CBF indicating whether the current RQT node is associated with a significant luma coefficient block; and
- outputting the bitstream.

24. The method of claim 23, further comprising in response to determining that neither the first nor the second condition is satisfied, omitting the luma CBF from the bitstream.

25. The method of claim 23, wherein the chroma transform block of the parent RQT node is split with the luma transform block of the parent RQT node when a size of the chroma transform block of the parent RQT node is greater than a minimum transform size for chroma transform blocks.

26. The method of claim 23, wherein when the luma CBF is not omitted from the bitstream and the luma CBF indicates that syntax elements of the luma coefficient block are not signaled in the bitstream, determining that all transform coefficients of the luma coefficient block are non-significant.

27. The method of claim 23, wherein:
- the luma CBF is a fourth luma CBF,
- the significant luma coefficient block is a fourth significant luma coefficient block, and
- the method further comprises determining whether the first condition is satisfied comprises determining, based at least in part on a first luma CBF, a second luma CBF and a third luma CBF, whether any of the sibling RQT nodes is associated with a significant luma coefficient block, the first luma CBF indicating whether a first one of the sibling RQT nodes is associated with a first significant luma coefficient block, the second luma CBF indicating whether a second one of the sibling RQT nodes is associated with a second significant luma coefficient block, and the third luma CBF indicating whether a third one of the sibling RQT nodes is associated with a third significant luma coefficient block.

28. The method of claim 23, wherein determining whether the second condition is satisfied comprises determining that the second condition is satisfied when:
- a Cb CBF of the parent RQT node indicates that the parent RQT node is associated with a significant Cb coefficient block or a Cr CBF of the parent RQT node indicates that the parent RQT node is associated with a significant Cr coefficient block; and
- the size of the luma transform block of the current RQT node is greater than a minimum transform size.

29. The method of claim 23, wherein:
- the current RQT node, the sibling RQT nodes and the parent RQT node are in a RQT of a coding unit (CU) of a picture; and
- a video coding format of the picture is YUV 4:2:0, 4:2:2, or 4:4:4.

30. A video encoding device comprising:
- a data storage medium storing video data; and
- one or more processors, coupled to the data storage medium, the one or more processors configured to:
  - determine whether a first condition is satisfied, wherein the first condition is satisfied when any sibling residual quad tree (RQT) node of a current RQT node is associated with a significant luma coefficient block;
  - determine whether a second condition is satisfied, wherein the second condition is satisfied when a chroma transform block of a parent RQT node of the current RQT node is significant and the chroma transform block of the parent RQT node is split with a luma transform block of the parent RQT node;
  - in response to determining that either the first condition or the second condition is satisfied, include a luma coded block flag (CBF) in a bitstream, the luma CBF indicating whether the current RQT node is associated with a significant luma coefficient block; and
  - output the bitstream.

31. The video encoding device of claim 30, wherein the one or more processors are configured such when neither the first nor the second condition is satisfied, the one or more processors omit the luma CBF from the bitstream.

32. The video encoding device of claim 30, wherein the chroma transform block of the parent RQT node is split with the luma transform block of the parent RQT node when a size of a luma transform block of the current RQT node is greater than a minimum transform size.

33. The video encoding device of claim 30, wherein the chroma transform block of the parent RQT node is split with the luma transform block of the parent RQT node when a size of the chroma transform block of the parent RQT node is greater than a minimum transform size for chroma transform blocks.

34. The video encoding device of claim 30, wherein:
- the luma CBF is a fourth luma CBF,
- the significant luma coefficient block is a fourth significant luma coefficient block, and the one or more processors are configured such that to determine whether the first condition is satisfied, the one or more processors determine, based at least in part on a first luma CBF, a second luma CBF and a third luma CBF, whether any of the sibling RQT nodes is associated with a significant luma coefficient block, the first luma CBF indicating whether a first one of the sibling RQT nodes is associated with a first significant luma coefficient block, the second luma CBF indicating whether a second one of the sibling RQT nodes is associated with a second significant luma coefficient block, and the third luma CBF indicating whether a third one of the sibling RQT nodes is associated with a third significant luma coefficient block.

35. The video encoding device of claim 30, wherein the one or more processors are configured such that to determine whether the second condition is satisfied, the one or more processors determine that the second condition is satisfied when:
- a Cb CBF of the parent RQT node indicates that the parent RQT node is associated with a significant Cb coefficient block or a Cr CBF of the parent RQT node indicates that the parent RQT node is associated with a significant Cr coefficient block; and
- the size of the luma transform block of the current RQT node is greater than a minimum transform size.

36. The video encoding device of claim 30, wherein:
- the current RQT node, the sibling RQT nodes and the parent RQT node are in a RQT of a coding unit (CU) of a picture; and
- a video coding format of the picture is YUV 4:2:0, 4:2:2, or 4:4:4.

37. A video encoding device comprising:
- means for determining whether a first condition is satisfied, wherein the first condition is satisfied when any sibling residual quad tree (RQT) node of a current RQT node is associated with a significant luma coefficient block;
- means for determining whether a second condition is satisfied, wherein the second condition is satisfied when a chroma transform block of a parent RQT node of the current RQT node is significant and the chroma transform block of the parent RQT node is split with a luma transform block of the parent RQT node;
- means for including, in response to determining that either the first condition or the second condition is satisfied, a luma coded block flag (CBF) in a bitstream, the luma CBF indicating whether the current RQT node is associated with a significant luma coefficient block; and
- means for outputting the bitstream.

38. A non-transitory computer-readable storage medium having instructions stored thereon that, when executed by one or more processors of a video encoding device, configure the video encoding device to:
- determine whether a first condition is satisfied, wherein the first condition is satisfied when any sibling residual quad tree (RQT) node of a current RQT node is associated with a significant luma coefficient block;
- determine whether a second condition is satisfied, wherein the second condition is satisfied when a chroma transform block of a parent RQT node of the current RQT node is significant and the chroma transform block of the parent RQT node is split with a luma transform block of the parent RQT node;
- in response to determining that either the first condition or the second condition is satisfied, include a luma coded block flag (CBF) in a bitstream, the luma CBF indicating whether the current RQT node is associated with a significant luma coefficient block; and
- output the bitstream.

39. The video decoding device of claim 10, wherein the video decoding device comprises at least one of:
- an integrated circuit;
- a microprocessor; or
- a wireless handset.

40. The video decoding device of claim 10, further comprising a display configured to display decoded video data including the reconstructed sample block.

41. The video encoding device of claim 30, wherein the video encoding device comprises at least one of:
- an integrated circuit;
- a microprocessor; or
- a wireless handset.

42. The video encoding device of claim 30, further comprising a camera configured to capture the video data.

* * * * *